US009404540B2

(12) United States Patent
Takahashi et al.

(10) Patent No.: US 9,404,540 B2
(45) Date of Patent: Aug. 2, 2016

(54) WHEEL BEARING APPARATUS WITH SENSOR

(71) Applicant: NTN CORPORATION, Osaka (JP)

(72) Inventors: Toru Takahashi, Iwata (JP); Kentarou Nishikawa, Iwata (JP); Wataru Hatakeyama, Iwata (JP)

(73) Assignee: NTN CORPORATION, Osaka (JP)

( * ) Notice: Subject to any disclaimer, the term of this patent is extended or adjusted under 35 U.S.C. 154(b) by 81 days.

(21) Appl. No.: 14/346,875

(22) PCT Filed: Sep. 21, 2012

(86) PCT No.: PCT/JP2012/074163
§ 371 (c)(1),
(2) Date: Mar. 24, 2014

(87) PCT Pub. No.: WO2013/047346
PCT Pub. Date: Apr. 4, 2013

(65) Prior Publication Data
US 2014/0212081 A1 Jul. 31, 2014

(30) Foreign Application Priority Data

Sep. 29, 2011 (JP) ................. 2011-215081
Dec. 2, 2011 (JP) ................. 2011-264277
Jan. 6, 2012 (JP) ................. 2012-001183

(51) Int. Cl.
*F16C 41/00* (2006.01)
*F16C 19/52* (2006.01)
(Continued)

(52) U.S. Cl.
CPC .............. *F16C 41/00* (2013.01); *B60B 27/0068* (2013.01); *B60T 8/245* (2013.01);
(Continued)

(58) Field of Classification Search
CPC ... B60B 27/0068; F16C 19/522; F16C 41/00; F16C 19/186; F16C 2326/02; G01L 5/16; G01L 5/0019; B60T 8/245
USPC ............................................ 384/448; 73/862
See application file for complete search history.

(56) References Cited

U.S. PATENT DOCUMENTS 5,710,716 A 1/1998 Hurst et al.
5,969,268 A 10/1999 Sommerfeld et al.
(Continued)

FOREIGN PATENT DOCUMENTS

CN 101238302 8/2008
CN 101326431 12/2008
(Continued)

OTHER PUBLICATIONS

Chinese Office Action dated Oct. 30, 2014 in corresponding Chinese Patent Application No. 201280047806.5.
(Continued)

*Primary Examiner* — Lisa Caputo
*Assistant Examiner* — Philip Cotey

(57) ABSTRACT

At least one or more sensor for detecting a load acting on a wheel support bearing apparatus is provided in such bearing device, a signal processor for processing an output signal of those sensors to generate a signal vector and a load calculator for calculating the load, which acts on a vehicle wheel, from the signal vector, are provided. The load calculator has a function of determining the presence or absence of a predetermined state of a vehicle, which may affects a result of calculation of the load, and performing two types of calculation process appropriate to the presence or absence. The presence or absence of the predetermined state of the vehicle, which is determined by the load calculator is, for example, ON/OFF of a brake.

17 Claims, 14 Drawing Sheets

(51) Int. Cl.
 B60B 27/00 (2006.01)
 B60T 8/24 (2006.01)
 G01L 5/00 (2006.01)
 G01L 5/16 (2006.01)
 *F16C 19/18* (2006.01)

(52) U.S. Cl.
 CPC ............ *F16C 19/522* (2013.01); *G01L 5/0019* (2013.01); *G01L 5/16* (2013.01); *F16C 19/186* (2013.01); *F16C 2326/02* (2013.01)

(56) References Cited

U.S. PATENT DOCUMENTS

| | | | |
|---|---|---|---|
| 6,038,933 | A | 3/2000 | Meyer |
| 6,619,102 | B2 | 9/2003 | Salou et al. |
| 6,634,208 | B2 | 10/2003 | Salou et al. |
| 6,701,780 | B2 | 3/2004 | Hofmann et al. |
| 7,206,702 | B2 | 4/2007 | Isono et al. |
| 7,653,507 | B2 | 1/2010 | Yamada et al. |
| 7,770,442 | B2 | 8/2010 | Ueda et al. |
| 7,770,675 | B2 | 8/2010 | Hayashi |
| 7,882,752 | B2 | 2/2011 | Ozaki et al. |
| 7,926,362 | B2 | 4/2011 | Andersson et al. |
| 8,167,497 | B2 | 5/2012 | Ozaki et al. |
| 8,540,431 | B2 | 9/2013 | Nishikawa et al. |
| 8,567,260 | B2 | 10/2013 | Nishikawa et al. |
| 2002/0012484 | A1 | 1/2002 | Salou et al. |
| 2002/0033638 | A1* | 3/2002 | Okada ............... B60T 8/171 303/20 |
| 2002/0061148 | A1 | 5/2002 | Salou et al. |
| 2003/0110860 | A1* | 6/2003 | Okada ............... B60B 27/00 73/593 |
| 2003/0145651 | A1 | 8/2003 | Hofmann et al. |
| 2003/0234578 | A1* | 12/2003 | Takahashi ......... B60T 8/171 303/168 |
| 2005/0012501 | A1 | 1/2005 | Isono et al. |
| 2006/0108170 | A1 | 5/2006 | Ishikawa et al. |
| 2007/0029872 | A1 | 2/2007 | Kurata et al. |
| 2007/0199745 | A1 | 8/2007 | Hayashi |
| 2008/0033679 | A1 | 2/2008 | Yamada et al. |
| 2008/0199117 | A1* | 8/2008 | Joki ............... G01L 5/0019 384/448 |
| 2008/0285901 | A1* | 11/2008 | Koike ............... G01L 5/0023 384/448 |
| 2009/0038414 | A1 | 2/2009 | Ozaki et al. |
| 2009/0049929 | A1 | 2/2009 | Ueda et al. |
| 2009/0301221 | A1 | 12/2009 | Andersson et al. |
| 2010/0064824 | A1* | 3/2010 | Oguma ............ F16C 19/186 73/862.541 |
| 2010/0135604 | A1 | 6/2010 | Ozaki et al. |
| 2010/0235064 | A1 | 9/2010 | Mallet et al. |
| 2011/0125421 | A1 | 5/2011 | Takahashi et al. |
| 2011/0185823 | A1 | 8/2011 | Nishikawa et al. |
| 2012/0014632 | A1 | 1/2012 | Nishikawa et al. |

FOREIGN PATENT DOCUMENTS

| | | |
|---|---|---|
| CN | 102187189 | 9/2011 |
| CN | 102365538 A | 2/2012 |
| EP | 1 659 385 A2 | 5/2006 |
| JP | 8-247868 | 9/1996 |
| JP | 10-23615 | 1/1998 |
| JP | 11-230841 | 8/1999 |
| JP | 2000-159076 | 6/2000 |
| JP | 2001-500979 | 1/2001 |
| JP | 2002-98138 | 4/2002 |
| JP | 2003-104139 | 4/2003 |
| JP | 2003-530565 | 10/2003 |
| JP | 2004-198247 | 7/2004 |
| JP | 2005-231417 | 9/2005 |
| JP | 2006-3281 | 1/2006 |
| JP | 2006-506276 | 2/2006 |
| JP | 2006-300086 | 11/2006 |
| JP | 2006-308465 | 11/2006 |
| JP | 2007-40782 | 2/2007 |
| JP | 2007-210463 | 8/2007 |
| JP | 2007-212389 | 8/2007 |
| JP | 2007-230288 | 9/2007 |
| JP | 2007-271005 | 10/2007 |
| JP | 2008-268201 | 11/2008 |
| JP | 2008-542735 | 11/2008 |
| JP | 2009-52918 | 3/2009 |
| JP | 2009-270711 | 11/2009 |
| JP | 2010-43901 | 2/2010 |
| JP | 2010-96565 | 4/2010 |
| JP | 2010-184614 | 8/2010 |
| JP | 2010-242902 | 10/2010 |
| JP | 2010-243378 | 10/2010 |
| JP | 2010-540338 | 12/2010 |
| JP | 2011-149517 | 8/2011 |
| WO | WO 99/04235 | 1/1999 |
| WO | WO 01/77634 A2 | 10/2001 |
| WO | WO 2006/016671 A1 | 2/2006 |
| WO | WO 2006/128878 | 12/2006 |
| WO | WO 2009/044022 A1 | 4/2009 |
| WO | WO 2010/110173 A1 | 9/2010 |

OTHER PUBLICATIONS

Japanese Office Action dated Jan. 27, 2015 in corresponding Japanese Patent Application No. 2011-215081.
International Search Report mailed Dec. 11, 2012 in corresponding International Patent Application No. PCT/JP2012/074163.
PCT International Preliminary Report on Patentability and Written Opinion of the International Searching Authority mailed Apr. 10, 2014 in corresponding International Patent Application No. PCT/JP2012/074163.
Chinese Office Action dated Apr. 13, 2015 in corresponding Chinese Patent Application No. 201280047806.5.
Japanese Office Action dated Aug. 4, 2015 in corresponding Japanese Patent Application No. 2011-264277.
Japanese Office Action dated Aug. 4, 2015 in corresponding Japanese Patent Application No. 2012-001183.
Extended European Search Report dated Jul. 15, 2015 in corresponding European Patent Application No. 12836565.7.
Decision of Grant issued Jan. 19, 2016 in corresponding Japanese Patent Application No. 2011-264277.
Japanese Office Action dated Sep. 1, 2015 in corresponding Japanese Patent Application No. 2011-215081.
Guanghua, "Vehicle Rollover Warning Design Based on TTR", Chinese Master's Thesis Full-text Database, Engineering Science and Technology II, section 2.2.1, 3 pages.
Chinese Office Action dated Mar. 18, 2016 in corresponding Chinese Patent Application No. 201380063989.4.

\* cited by examiner

ROAD SURFACE WORKING FORCE : Fx,Fz
BEARING WORKING FORCE :  Fxb,Fzb

POSITION OF BRAKE CALIPER
RADIUS :  $R_B$
ANGLE FROM X AXIS : $\theta$

TIRE RADIUS : $R_W$
RADIUS RATIO : $\alpha = R_W/R_B$

ROAD SURFACE WORKING FORCE: Wgx, Wgz

WHEEL BEARING APPARATUS WITH SENSOR

CROSS REFERENCE TO THE RELATED APPLICATION

This application is a U.S. national stage application under 35 U.S.C. 371 of PCT/JP2012/074163, filed Sep. 21, 2012, and claims foreign priority benefit of Japanese Patent Applications No. 2011-215081, filed Sep. 29, 2011, No. 2011-264277, filed Dec. 2, 2011, and No. 2012-001183, filed Jan. 6, 2012, in the Japanese Intellectual Property Office, the contents of which are incorporated herein by reference.

BACKGROUND OF THE INVENTION

1. Field of the Invention

The present invention relates to a sensor equipped wheel support bearing apparatus equipped with a load sensor for detecting a load imposed on a bearing unit of a vehicle wheel and a vehicle control device which utilizes such sensor equipped wheel support bearing apparatus to perform a control of preventing movement of an vehicle in a direction counter to the direction of forward travel at the time of start of the vehicle on a grade.

2. Description of Related Art

As a technique to detect the load acting on each of the vehicle wheels of an vehicle, a sensor equipped wheel support bearing assembly has been suggested in, for example, the patent document 1 listed below, in which a strain gauge is pasted to an outer ring outer diametric surface of a wheel support bearing assembly so that the load can be detected from a strain induced in the outer ring outer diametric surface. Also, another suggestion has been made in the patent document 2 listed below in which a displacement detecting system in which an encoder is employed as a load sensor is employed in the sensor equipped wheel support bearing assembly capable of detecting the load inputted from a road surface. A sensor equipped wheel support bearing assembly has also suggested in the patent document 3 listed below, in which an influence of a braking force is compensated for by the utilization of a pressure developed in a brake cylinder. In addition, a sensor equipped wheel support bearing assembly has been suggested in the patent documents 4 and 5 listed below, in which in order to compensate for the influence brought about by the braking force, a sensor, which is separate from the load sensor, is employed for detecting the braking force acting on a caliper. Yet, although not intended to compensate for the influence brought about by the braking force, the patent document 6 listed below suggests a sensor equipped wheel support bearing assembly in which a plurality of sensor units are provided in a bearing fixed ring as strain detecting sensors so that the difference in amplitude of respective output signals of the sensor units that are disposed in face-to-face relation with each other can be determined to allow an input load to be estimated by classifying calculations according to situations by means a value thereof.

The patent document 7, for example, suggests mounting of a sensor unit, comprised of a strain generation member, which is fixed by means of three contact fixing segments, and two strain sensors mounted on the strain generation member, on an outer ring of a bearing assembly to thereby generate a single strain signal, so that an added value and an amplitude value and others of respective output signals of the two strain sensors are utilized as an output of the sensor unit to allow an estimating calculation process of an inputted load to be executed. Yet, a sensor equipped wheel support bearing assembly is suggested in which a displacement sensor (an eddy current sensor, a magnetic sensor, a reluctance sensor and others) is mounted on a stationary ring of the bearing assembly and a detection target is mounted on a rotatable ring of the bearing assembly and the amount of relative displacement of the inner and outer rings is then determined so that from the relationship between a preset load and the displacement the load then applied can be determined.

Although not associated with the wheel support bearing assembly, some vehicle control methods have been suggested in, for example, the patent documents 8 to 10 listed below, for minimizing a backward dragging of the vehicle at the time of the hill start of such vehicle. Specifically, the patent document 8 listed below discloses a technique employed in an electrically powered vehicle to properly control the creep torque at the time of parking of the vehicle, the patent document 9 listed below discloses a technique also employed in an electrically powered vehicle to control the start of a vehicle engine as necessitated by estimating a drive torque required to start, and the patent document 10 listed below discloses a technique to estimate a required clutch torque by measuring the gradient of a slope and then to release the brake with the required torque output. In addition to the foregoing patent documents, the patent document 11 listed below suggests an example of the specific control procedure to enable the vehicle to be operated with no delay in response to an input from a vehicle driver at the time of the start of the vehicle.

PRIOR ART DOCUMENTS

Patent Documents

Patent Document 1 JP Laid-open Patent Publication No. 2003-530565
Patent Document 2 JP Laid-open Patent Publication No. 2007-212389
Patent Document 3 JP Laid-open Patent Publication No. 2006-308465
Patent Document 4 JP Laid-open Patent Publication No. 2008-268201
Patent Document 5 JP Laid-open Patent Publication No. 2002-098138
Patent Document 6 P Laid-open Patent Publication No. 2010-242902
Patent Document 7 JP Laid-open Patent Publication No. 2009-270711
Patent Document 8 JP Laid-open Patent Publication No. H10-23615
Patent Document 9 JP Laid-open Patent Publication No. 2007-230288
Patent Document 10 JP Laid-open Patent Publication No. 2010-540338
Patent Document 11 JP Laid-open Patent Publication No. 2010-184614

SUMMARY OF THE INVENTION

As disclosed in, for example, paragraphs [0013] to [0014] in the patent document 4 listed above, the system designed to detect an input load (road surface reactive force, or a reactive force from the road surface) while the sensor is provided in the bearing assembly is incapable of detecting only the road surface reactive force during braking since at the time of a mechanical brake operation the braking force is superposed with an input load through a brake rotor.

In order to resolve the problem discussed above, the patent documents 3 to 5 listed above suggests the separate installation of a sensor for detecting the braking force, but in this case new problems and/or inconveniences arise in which, consequent upon the increase of the number of sensors used, the system tends to become complicated and is accompanied by an increase of wirings, an increase of the cost and an increase of the weight.

Also, it may be possible to detect the hydraulic braking pressure to determine the braking force as suggested in the patent document 3 listed above. However, according to this method, since the response of the hydraulic braking pressure is not constant, an accurate extraction of the braking force, included in a load, from such load detected in the bearing assembly is difficult to achieve and, therefore, it is not easy to increase the accuracy with which the load can be detected.

With the load sensor designed in consideration of the influence brought by the brake on the bearing assembly, the accuracy of the load that is detected will be lowered in the event of the occurrence of a change in state of the brake with, for example, passage of time. For this reason, the need has been recognized to regularly examine if the change in state occurs in the brake. Accordingly, in the prior art sensor equipped wheel support bearing assembly of the type discussed above, a bulky and large scale equipment is needed to correct the sensor output by applying an accurate load to the vehicle wheel for confirmation of the change in state and, hence, problems such as, for example, increased costs and increase of the number of process steps resulting from the use of the bulky and large scale equipment referred to above tend to occur. In view of the above, a technique to correct the sensor output easily and efficiently at a check out time of the vehicle has been longed for.

According to the technique disclosed in each of the patent documents 8 to 10 referred to above, at the time of the hill start of the vehicle to drive uphill, the vehicle is apt to move in a direction backwardly of the forward travelling direction when the brake is held in an OFF state. In the event that there is no drive torque or is insufficient at the time of that backward movement of the vehicle, the vehicle moves backwards and will possibly collide against an vehicle behind. Because of that, at the backwardly moving state of the vehicle, no stable and smooth acceleration will take place at the time of start of the vehicle. Accordingly, the need is recognized to inhibit the vehicle from moving at the time of the hill start even though the brake is held in the OFF state.

It is, however, that according to the technique disclosed in the patent document 8 referred to above, estimation of the creeping torque required to keep the vehicle in a stopped condition is carried out by detecting the start of movement of the vehicle and, therefore, a delay tends to occur in operation an the vehicle tends to be somewhat dragged backwards on a slope road.

Even with the technique disclosed in the patent document 9 referred to above, estimation of the minimum required drive torque is accomplished by detecting the start of movement of the vehicle and, hence, a required torque value cannot be estimated before the vehicle is dragged backwards on the slope road. Accordingly, as is the case with the teachings of the patent document 8 referred to above, the vehicle is likely to be dragged backwards on the slope road.

If as is the case with the technique disclosed in the patent document 10 referred to above, the required drive torque value is estimated with the use of a inclinometer and an accelerometer and application of the braking force is delayed by the time the output torque value exceeds over the required value, backward movement of the vehicle on the slope road can be avoided. However, the estimated drive torque is that calculated from the inclination of the vehicle as a whole and, therefore, there is the possibility that an error may become large. Also, since it is so structured as to estimate the output torque by detecting the position of a control member of a clutch, an error of the output torque does possibly become large and, depending on the accuracy of estimation the backward movement of the vehicle on the slope road will occur. Where as discussed above the structure is employed in which the state of the vehicle is estimated by the inclinometer, in the event that ground contacting conditions of the vehicle wheels differ from one wheel to another, an accurate estimation of the vehicle state is difficult to accomplish and, therefore, the backward movement of the vehicle on the slope road and/or application of an excessive drive torque may take place. Accordingly, in order to optimally control the driving force in dependence on the state of each of the vehicle wheels, a signal, which has detected a loaded condition that reflects the ground contacting condition of each of the vehicle wheel, is needed.

In view of the foregoing, the present invention has an object to provide a sensor equipped wheel support bearing apparatus capable of accurately detecting a load even when the state of an vehicle is a predetermined state such as that in which the vehicle is braked, by correcting a possibility of a detected load at a bearing unit from being affected by the predetermined state of the vehicle such as, for example, during a brake operating time.

Another object of the present invention is to provide a sensor equipped wheel support bearing apparatus of the kind referred to above, in which an output correction of a load sensor can be simply and efficiently performed at the time of check out of the vehicle.

A further object of the present invention is to provide a sensor equipped wheel support bearing apparatus capable of obtaining a sensor output used to enable the vehicle to accomplish a hill start stably and without being dragged backwards, and a vehicle control device of a type utilizing the sensor output to enable the vehicle to accomplish the hill start in a stabilized fashion.

In order to accomplish the foregoing objects of the present invention, the sensor equipped wheel support bearing apparatus designed in accordance with the present invention includes a bearing assembly including an outer member having an inner periphery formed with a plurality of rolling surfaces, an inner member having an outer periphery formed with rolling surfaces held in face to face relation with the rolling surfaces of the outer member, a plurality of rows of rolling elements interposed between the respective rolling surfaces in the outer member and the inner member; at least one or more sensor to detect a load acting on the bearing assembly, a signal processor to process an output signal from each sensor to generate a signal vector, and a load calculator to calculate a load acting on the vehicle wheel from the signal vector; in which the load calculator has a function to determine the presence or absence of a predetermined state in a vehicle that affects a result of calculation of the load, and to perform two types of calculations that correspond respectively to the presence and absence of the state. The presence or absence of the predetermined state of the vehicle which is determined by the load calculator may be, for example, ON or OFF of the brake.

According to the above described construction, the load calculator to calculate the load acting on the vehicle wheel has a function of determining the presence or absence of the predetermined state of the vehicle, which may affect the result of calculation of the load, and performing the two types of calculations appropriate to the presence or absence of the predetermined state. Accordingly, the detected load of the bearing assembly corrects what is affected by the influence of the predetermined state of the vehicle such as occurring at the time of brake operation to enable the accurate detection of the load regardless of whether or not the state of the vehicle is held in the predetermined state such as during the braking.

In one embodiment of the present invention, information on the ON or OFF of the brake that is determined by the load calculator may be inputted from outside of the load calculator. In other words, as information from the vehicle, for example, information from an ECU (electric control unit) that performs an integrated control of the vehicle, it may be inputted to the load calculator.

In one embodiment of the present invention, the load calculator may output both of two types of results of calculation that correspond respectively to the brake ON or OFF. Which one of the two types of the results o the calculation is employed outputted may be determined in the ECU on the side of the automobile vehicle.

In one embodiment of the present invention, the load calculator may calculate a load Fx which acts at least in a forward and rearward direction of the wheel support bearing assembly. In this case, the load calculator referred to above may determine the brake ON or OFF by utilizing the load Fx acting in the forward and rearward direction, which is a result of a calculation process thereof. For example, with respect to the result of calculation of the load Fx acting in the forward and rearward direction during the brake OFF state, arrangement may be made to determine by setting a proper threshold value. In the case of this construction, there is no need to input the information on the brake ON or OFF from the outside.

In one embodiment of the present invention, the load of the vehicle wheel calculated by the load calculator, may be a load acting on a drive wheel, and when the load calculator determines the brake ON state, information on a driving force applied by the vehicle may be supplied from the vehicle to the load calculator, and the load calculator corrects a result of calculation based on the information. Where it is applied to the drive wheel, when the drive torque is inputted from the driving axle during the operation of the brake, an error proportional to the magnitude thereof occurs and, therefore, the correction is preferably made with the use of information on the drive torque on a side of the vehicle as information on the driving force.

In one embodiment of the present invention, the sensor to detect the load applied to the bearing assembly may be of a type capable of detecting a relative displacement between the outer member and the inner member.

In one embodiment of the present invention, the sensor to detect the load applied to the bearing assembly may be of a type capable of detecting a strain occurring in one of the outer member and the inner member which serves as the stationary member.

In one embodiment of the present invention, the signal processor may calculates an average value and an amplitude value from an output signal of the sensor and then to generate a signal vector from those values.

In one embodiment of the present invention, the sensor referred to above may be a sensor unit provided in an outer diametric surface of one of the outer member and the inner member which serves as the stationary member In this case, the sensor unit referred to above includes a strain generation member, fixed to the outer diametric surface of the stationary member in contact therewith, and one or more strain detection elements fitted to the strain generation member to detect the strain occurring in the strain generation member. The sensor unit referred to above is preferably disposed four in number on an upper surface area, a lower surface area, a right surface area and a left surface area of the outer diametric surface of the stationary member, which correspond respectively to top, bottom, left and right position relative to a tire tread, and are equidistantly spaced in a phase difference of 90° in a circumferential direction thereof. Positioning of the four sensor units in this way makes it possible to estimate a vertically acting load Fz, a load Fy acting in the forward and rearward direction and an axially acting load Fy, all of which act on the wheel support bearing assembly.

In one embodiment of the present invention, the sensor unit referred to above may include a strain generation member, having three or more contact fixing segments that are fixed to the outer diametric surface of the stationary member in contact therewith, and two or more strain detection elements fixed to the strain generation member to detect a strain occurring in the strain generation member.

In one embodiment of the present invention, in the sensor unit of the kind referred to above, the strain generating elements may be provided intermediate between the neighboring first and second contact fixing segments and intermediate between the neighboring second and third contact fixing segments, respectively. In this case, a distance between the neighboring contact fixing segments or a distance between the neighboring strain detection elements is set to a value which is $\{n+\frac{1}{2}\}$ times an arrangement pitch of the rolling elements, wherein n represents integer. In the case of this construction, the signals of the two strain detection elements come to have a phase difference of about 180° and the average value, which is the sum of those signals, represents a value in which a varying component resulting from the passage of the rolling element has been cancelled. Also, the amplitude value, which is the difference component of the signals of the two strain detection elements, will be the accurate one, for influences of temperature and influences of slippage of a knuckle·flange surface is more accurately eliminated.

In this case, the signal processor may make use of the sum of the respective output signals of the neighboring strain generating elements in the sensor unit as the average value to generate the signal vector.

In one embodiment of the present invention, the sensor equipped wheel support bearing may also include a revision mode execution unit to check the result of calculation by the load calculator. The load calculator may have a function of calculating an influence, exerted by the brake upon the bearing assembly, as a brake conversion coefficient, and of determining a calculation coefficient matrix for the brake ON state from a calculation coefficient matrix for the brake OFF state to calculate the load for the brake ON state. It is to be noted that the term "check (or, checking)" has to be understood as meaning an inspection, examination or investigation.

According to the construction described above, since the use is made of the revision mode execution unit to check the result of calculation performed by the load calculator, an output correction of the load sensor can be simply carried out at the time of checkout of the vehicle. By way of example, where the load calculator has a function of calculating the influence, which the brake may affect on the bearing assembly, as a brake conversion coefficient, then determines a calculation coefficient matrix for the brake ON state from a calculation coefficient matrix for the brake OFF state, and calculating the load for the brake ON state, the revision mode execution unit performs the following operation to calculate the brake conversion coefficient to perform the output correction of the load sender. In other words, the revision mode execution unit checks the state of the brake from the ON/OFF information of the brake and the drive torque information, both inputted, and then calculates the brake conversion coefficient as a result of such checking. The known drive torque inputs to each vehicle wheel, while the brake is in the ON state, and then calculates the brake conversion coefficient from the bearing load then detected.

In one embodiment of the present invention, the revision mode execution unit may have a function of rewriting the brake conversion coefficient, which has already been stored, into a brake conversion coefficient determined by checking of the result of the calculation. Parameters of the brake conversion coefficients may include, for example, a ratio ($\alpha$) of a tire radius/a brake caliper mounting position radius and an angle ($\theta$) from a brake caliper x axis to the brake caliper mounting position.

In one embodiment of the present invention, the revision mode execution unit may execute a revision with the use of a load value detected, when the drive torque is applied while the vehicle is in a stopped state and the brake is in the ON state. In this case, when the vehicle has a driven wheel, the revision mode execution unit may apply the drive torque from the drive wheel while the brake of the driven wheel, which is a target to be measured, is in the ON state, to thereby determine an influence of the brake on the driven wheel.

Also, the revision mode execution unit may input a brake information and a drive torque information, both used for correction, from the host ECU mounted on a side of the vehicle. In this case, the vehicle may be an electrically powered vehicle and the drive torque information may then be the one estimated from a command value that is outputted to a drive circuit of an electric motor, which is a drive source for the electrically powered vehicle, or inputted from the host ECU mounted on a side of the vehicle. Alternatively, the drive torque information referred to above may be the one detected by a torque sensor.

In one embodiment of the present invention, the revision mode execution unit may have a function of detecting an abnormality occurring in a sensor operation by execution of the revision mode.

In one embodiment of the present invention, the revision mode execution unit may be operable to detect the abnormality by comparing an evaluation value with a predetermined threshold value, the evaluation value being represented by a difference value between the drive torque, which is applied while the vehicle is held stopped with the brake in the ON state, and an input torque estimated from a result of calculation by the load calculator.

In one embodiment of the present invention, the signal processor may make use of output signals of the sensors during a certain period of time to calculate an average value thereof and generates the signal vector from the average value and wherein the load calculator calculates from the signal vector the load that is applied to the vehicle wheel.

In one embodiment of the present invention, the signal processor may make use of output signals of the sensors during a certain period of time to calculate an average value and an amplitude value thereof, generate and generates the signal vector from those values and in which the load calculator calculates from the signal vector the load that is applied to the vehicle wheel.

Also, the load calculator may calculate the load by the use of an arithmetic expression using the signal vector and a predetermined load estimation parameter.

In one embodiment of the present invention, the load calculator may have a road surface working force calculation mode, in which the load acting on the road surface is calculated and outputted, and a bearing working force calculation mode in which the load acting on the wheel support bearing assembly is calculated and outputted.

According to the sensor equipped wheel support bearing apparatus of the construction described above, the load calculator has the road surface working force calculation mode to calculate and output the load acting on the road surface and the bearing working force calculation mode to calculate and output the load acting on the road surface. Because of it, the sensor output required to allow the vehicle to stably initiate the hill start without being backwardly dragged can be obtained as follows. This will now be explained. If the drive torque from the vehicle is inputted in the vehicle then parked on the slope road with the brake held in the ON state, the load is applied through the brake disc to the wheel support bearing assembly and a change occurs in the force Fxb acting in the x direction of the wheel support bearing assembly. At this time, so that the load value in the wheel support bearing assembly, which has been calculated during the bearing working force calculation mode of the load calculator becomes equal to the road surface working force Wxg calculated during the road surface working force calculating mode before the application of the drive torque, when the drive torque is inputted, the torque being applied from the brake pad to the brake disc comes to be held in a zero condition. In other words, it comes to be held in a condition in which the vehicle is unable to move even though the brake is released. In this case, the load calculator can calculate and output a road surface reactive force Wxg and the load Fxb of the wheel support bearing assembly during the road surface working force calculating mode with the brake held in the ON state.

In view of the above, in the host ECU that executes the integrated control of the vehicle, it is possible to accomplish a control of a start operation in which, with the brake held in the ON state, the road surface working force Wxg, which is a result of calculation performed by the load calculator, is obtained, the drive torque is subsequently applied while the load value Fxb in the wheel support bearing assembly, which is a result of calculation, from the load calculator, and, when the bearing load value Fxb becomes equal to the road surface working force Wxg, the brake is released to permit the vehicle to start moving. Such operating procedures can be accomplished during a period of time, in which the brake is actually released, at the time the vehicle drive then depressing a brake pedal starts depressing an accelerator pedal, as disclosed in, for example, the patent document 11 referred to previously.

It is to be noted that not only can the brake release at the time of the hill start be accomplished under an automatic control executed by the host electric unit as hereinabove described, but the vehicle driver can perform a similar brake release manually with the use of the road surface working force Wxg, which is the result of calculation performed by the load calculator, and the load value Fxb at the wheel support bearing assembly.

As discussed above, according to the above construction, since the load calculator has the road surface working force calculating mode, during which the load acting on the road surface is calculated and outputted, and the bearing working force calculating mode, in which the load acting on the wheel support bearing assembly is calculated and outputted, a sensor output can be obtained of a kind which enables the vehicle to accomplish the hill start stably without being backwardly dragged. And, with the sensor output utilized, the hill start of the vehicle can be accomplished stably without being backwardly dragged either manually by the operation of the vehicle driver or under the automatic control.

In one embodiment of the present invention, the load calculator may output a result of calculation of both of the road surface working force calculation mode and the bearing working force calculation mode. Also, the sensor equipped wheel support bearing apparatus may further include a calculation result selection command unit having a function of commanding the load calculator to select one result to be outputted from the results of calculation from the road surface working force calculation mode and the bearing working force calculation mode.

Also, a function of selecting such one of the results of the calculation to be outputted, which such one of the results of calculation is either one of the road surface working force calculation mode and the bearing working force calculation mode is to be outputted to the load calculator, may be provided in a host ECU on a side of the vehicle, which is outside of the sensor equipped wheel support bearing apparatus.

In one embodiment of the present invention, the calculation under the road surface working force calculation mode may be performed on the basis of a correction process to correct a result of the calculation under the bearing working force calculation mode with a change component resulting from an influence of the braking force.

In such case, the load conversion coefficient corrected, which is used in the correction process, may be calculated based on a load conversion coefficient calculated for the brake OFF state, with the use of a ratio ($\alpha$) of a tire radius/a brake caliper mounting position radius and an angle ($\theta$) from a brake caliper x axis to the brake caliper mounting position, which has already been stored.

The present invention also provides a vehicle control device for performing a vehicle control with the use of the sensor equipped wheel support bearing apparatus designed in accordance with any one of the previously described constructions of the present invention. This vehicle control device includes a brake release control unit operable to obtain a road surface load (Wgx), which is calculated and outputted by the load calculator in the sensor equipped wheel support bearing apparatus under the road surface working force calculation mode during a condition, in which no driving force is applied while the vehicle is held standstill during the brake OFF state, and subsequently to control the driving force while monitoring the bearing load (Fxb), which is calculated and outputted by the load calculator under the bearing working force calculation mode during the brake ON state, to thereby release the brake under proper conditions.

According to the foregoing construction of the vehicle control device, with the vehicle control device utilizing the sensor output of the sensor equipped wheel support bearing apparatus, the hill start of the vehicle can be stably accomplished under an automatic control.

In such case, the break release control unit may have a function of evaluating the values of the road surface load (Wgx) and the bearing load (Fxb) obtained from the sensor equipped wheel support bearing apparatus when the vehicle is stopped under the brake ON state to determine a condition in which the vehicle wheel is standstill on an inclined surface, in the event that a difference between those loads is larger than a predetermined threshold value.

Also, the brake release unit may define the proper condition for release of the brake when the value of the bearing load (Fxb), which have been obtained from the sensor equipped wheel support bearing apparatus, while the vehicle is stopped with the brake held in the ON state, becomes substantially equal to the road surface load (Wgx) obtained from the sensor equipped wheel support bearing apparatus while no driving force is applied.

In one embodiment of the present invention, the brake release control unit may execute its control during a period from when a vehicle driver releases the brake to shift to a travelling condition to the time of actual release of the brake.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A first embodiment of the present invention will be described in detail with particular reference to FIG. 1 to FIGS. 12A and 12B. This first embodiment is applied to the third generation model of a wheel support bearing apparatus 100 of an inner ring rotating type of the support of a vehicle drive wheel. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 1:
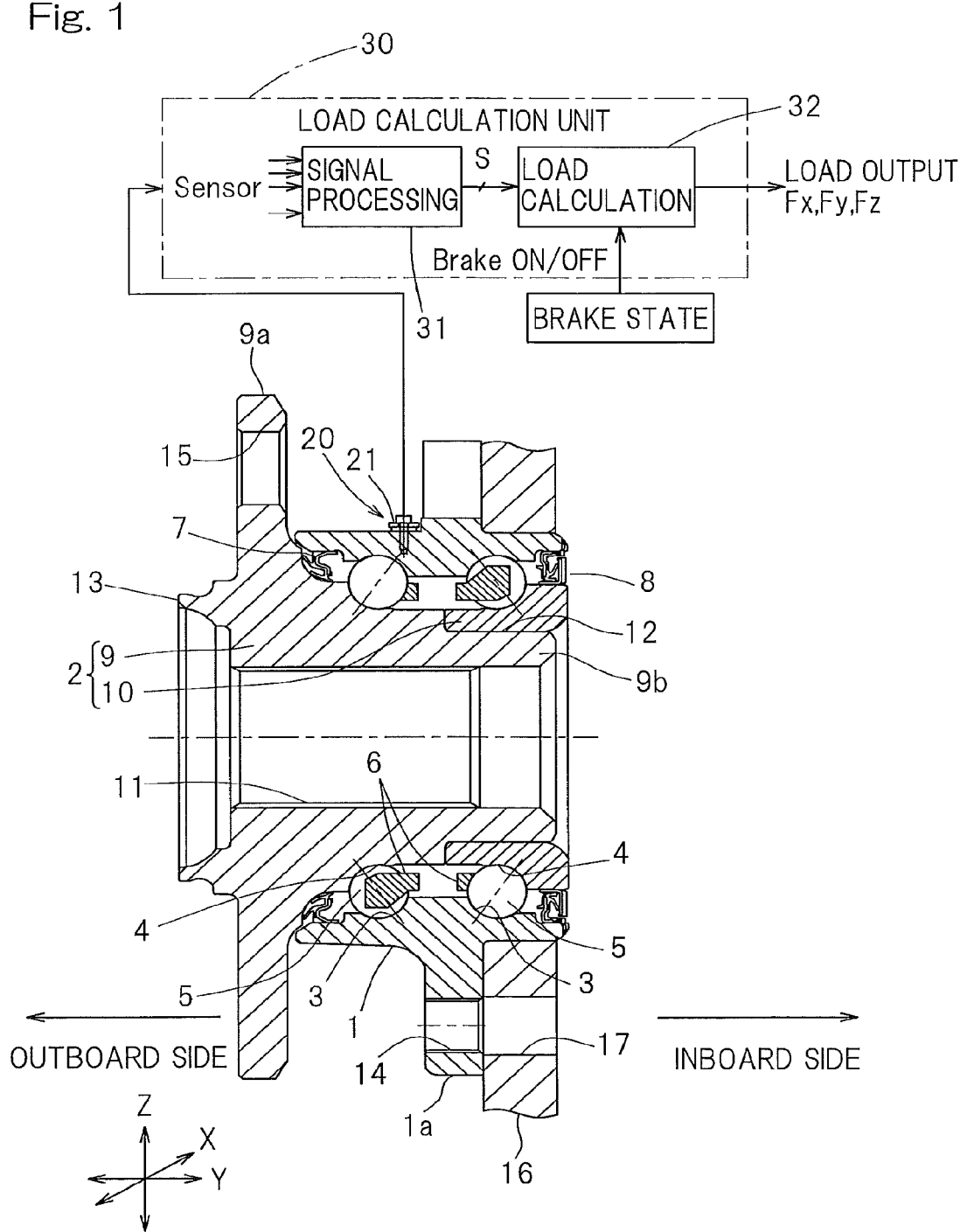
FIG. 1 is a diagram showing a longitudinal sectional view of a sensor equipped wheel support bearing apparatus, designed according to a first embodiment of the present invention, and a block diagram showing a conceptual construction of a detection system therefor.

The wheel support bearing apparatus 100 in the sensor equipped wheel support bearing assembly according to the first embodiment includes, as best shown in a longitudinal sectional view in FIG. 1, an outer member 1 having an inner periphery formed with a plurality of rolling surfaces 3, an inner member 2 having an outer periphery formed with a plurality of rolling surfaces 4 in face to face relation with the plurality of rolling surfaces 3, and a plurality of rows of rolling elements interposed between the rolling surfaces 3 and 4. This wheel support bearing apparatus 100 is in the form of a double row angular contact ball bearing type in which the rolling elements 5 are in the form of balls retained in a ball retainer 6 employed for each row. The rolling surfaces 3 and 4 are each having an arcuate sectional shape and are so formed as to have respective ball contact angles that are held in back to back relation to each other. Opposite ends of a bearing space delimited between the outer member 1 and the inner member 2 are sealed by respective sealing members 7 and 8.

The outer member 1 serves as a stationary member and is of one piece construction including a vehicle body fitting flange 1a, adapted to be fitted to a knuckle 16 forming a part of a suspension system (not shown) of a vehicle body structure. The flange 1a is formed with an internally threaded hole 14 defined at a plurality of circumferential locations thereof for securement to the knuckle. The vehicle body fitting flange 1a can be fitted to the knuckle 16 by inserting a corresponding knuckle bolt (not shown) in a bolt insertion hole 17, defined in the knuckle 16, from an inboard side and then firmly threading such bolt into the internally threaded hole 14 in the flange 1a.

The inner member 2 serves as a rotating member and includes a hub axle 9 having a wheel mounting hub flange 9a, formed integrally therewith, and an inner member 10 mounted on an outer periphery of an axle portion 9b of the hub axle 9 on the inboard side thereof. The above described rows of the rolling surfaces 4 are formed in the hub axle 9 and the inner member 10, respectively. The outer periphery of an inboard end of the hub axle 9 is formed with an inner ring mounting surface area 12 that is radially inwardly stepped to define a reduced diameter portion, and the inner member 10 referred to above is mounted on this inner ring mounting surface area 12. The hub axle 9 has a center portion formed with a throughhole 11 defined therein. The hub flange 9a referred to above is formed with a press fitting hole 15 defined at a plurality of circumferential locations thereof for receiving a corresponding hub bolt (not shown). At a portion of the hub axle 9 in the vicinity of a root portion of the hub flange 9a, a cylindrical pilot portion 13 for guiding a vehicle wheel and a brake component (not shown) protrudes towards the outboard side.

Figure 2:
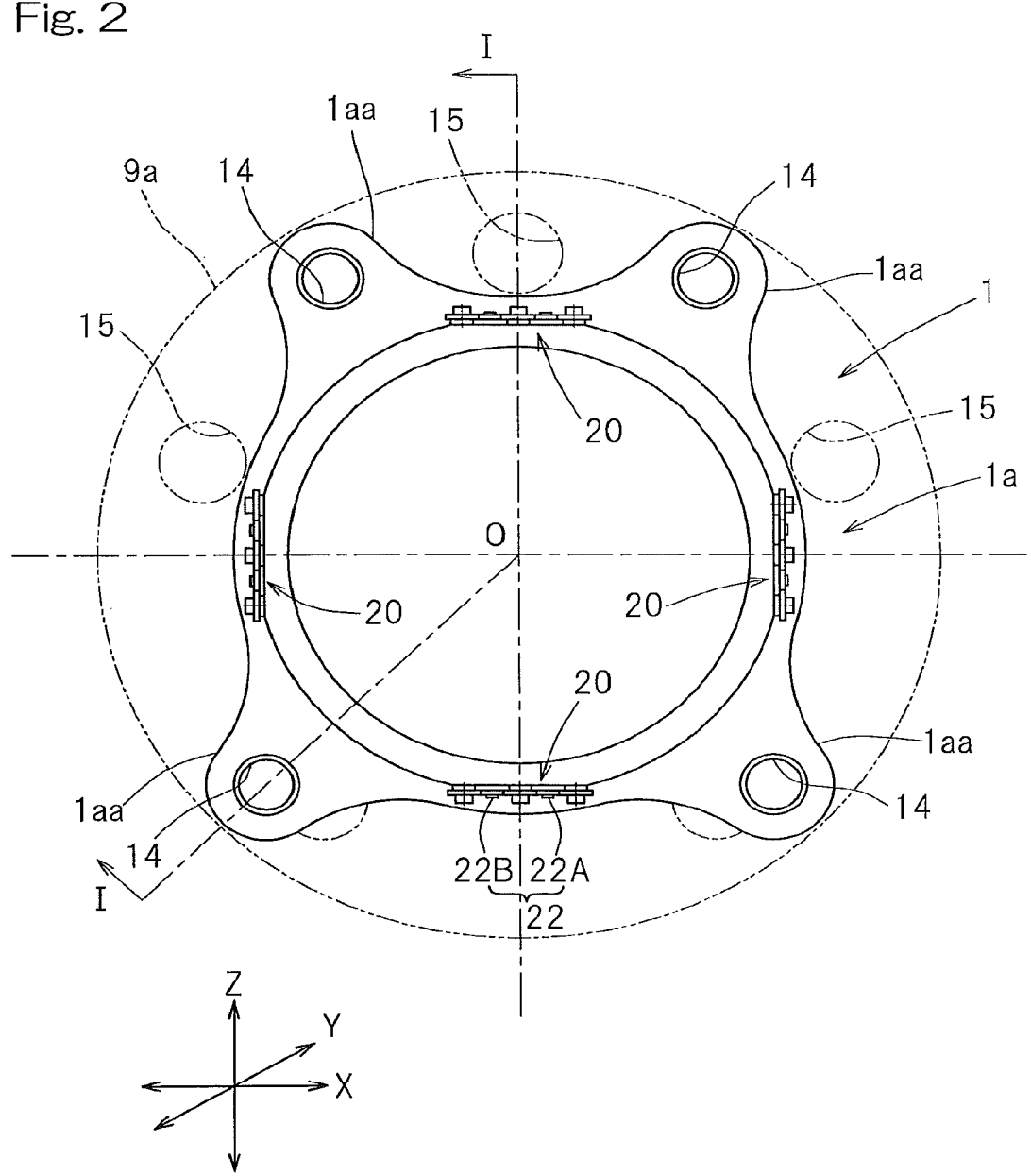
FIG. 2 is a front elevational view showing an outer member of the bearing device as viewed from an outboard side.

FIG. 2 illustrates a front elevational view of the outer ring 1 of the wheel support bearing apparatus 100 as viewed from an outboard side. It is to be noted that FIG. 1 is a cross sectional view taken along the line I-I in FIG. 2. The vehicle mounting flange 1a referred to above is of a design in which circumferential portions thereof, where the internally threaded holes 14 are formed, are formed as projecting pieces 11aa protruding radially outwardly beyond the remaining portion of the flange 1a.

The outer member 1, which serves as the stationary member, has an outer diametric surface on which four sensor units 20, which are load detecting sensors, are provided. In the illustrated example, those sensor units 20 are provided on upper, lower, right and left surface area of the outer diametric surface of the outer member 1, which correspond respectively to top, bottom, forward and rearward positions with respect to a tire contacting surface.

Each of the sensor units 20 has a strain detection element 22 (22A and 22B) that is electrically connected with a load calculation unit 30 best shown in FIG. 1. The load calculation unit 30 includes a signal processor 31 for processing an output signal of each of the sensor units 20 to generate a signal vector and a load calculator 32 for calculating from the signal vector a load applied to a vehicle wheel. The signal processor 31 and the load calculator 32 may not be necessarily integrated together as the load calculation unit 30, and may be provided separately. Also, the load calculation unit 30 including the signal processor 31 and the load calculator 32 may be mounted on the wheel support bearing apparatus 100 or, alternatively, mounted on the vehicle as a component separate from the wheel support bearing apparatus 100 and positioned in the vicinity of, for example a main ECU or positioned as, for example, a control section subordinate to an integrated control section of the ECU.

The load calculator 32 referred to above has a function of determining the presence or absence of a predetermined state of the vehicle, which may affects a result of calculation of the load, and then performing two types of calculations in dependence of the presence or absence of the predetermined state. In the instance as shown, the load calculator 32 determines an ON or OFF state of a brake as the presence or absence of the predetermined state of the vehicle which may affect the result of calculation of the load, and then performs the two type of calculation processing in dependence on the ON and OFF states of the brake. In the example shown in FIG. 1, information concerning the brake ON or OFF is inputted to the load calculator 32 as information from the vehicle, which is the outside, for example, as direct information from the ECU (electric control unit) or the brake. It is to be noted that where the load calculator 32 is provided as a part of the ECU, the information from the ECU referred to above is inputted to the load calculator 32 from a portion of the ECU which performs a host control to the load calculator 32.

Where as disclosed in, for example, the patent document 4 referred to previously the use of a sensor is made on a bearing, employed in a vehicle wheel equipped with a mechanical brake, so as to detect an input load (road surface reactive force) from a road surface, the braking force through a brake rotor tends to superpose the input load during the braking operation and, therefore, only the road surface reactive force cannot be detected when the brake is in the ON state. At least in the cases that load component to be detected is a load component Fx, which acts in a forward and rearward direction, or a load component Fz, which acts in a vertical direction, influences of the braking force tend to be generated.

This principle will now be discussed with particular reference to FIG. 7. It is assumed that a position of a brake pad in the brake rotor such as, for example, a brake disc is upwardly of an angle θ from the travelling direction and, as a position of the radius RB, the braking force FB is acting on the brake rotor. Also, assuming that the wheel radius is expressed by RW, and the input torque Tdrive is acting from the driving force. In this condition, assuming that load components of the road surface reactive force then receiving from the road surface are expressed by Fx and Fz, the loads Fxb and Fzb detected by the bearing assembly can be expressed by the following equations (1-1) and (1-2):

$$Fxb = Fx - FB \cdot \sin\theta \quad (1\text{-}1)$$

$$Fzb = Fz + FB \cdot \cos\theta \quad (1\text{-}2)$$

where Fx and Fz represent road surface reactive forces (loads acting from the road surface on a tire) and Fxb and Fzb represent bearing working forces (load acting on a bearing rotating ring including an interference component of the brake).

In this instance, assuming that the drive torque inputted from a drive shaft is expressed by Tdrive and a braking torque resulting from the operation of the brake is expressed by Fb·RB, a relational equation for a torque acting on the vehicle wheel can be expressed by the following equation (2):

$$Fx \cdot Rw = Tdrive - FB \cdot RB \quad (2)$$

From this relational equation, the braking force FB can be expressed by the following equation (3):

$$FB = (Tdrive - Fx \cdot Rw)/RB \quad (3)$$

In other words, when the use of the sensor is made on the bearing assembly and the input load (road surface reactive force) from the road surface is to be detected, the load component proportional to the braking force FB are detected as added to a road surface load desired to be determined, as expressed by the equations (1-1) and (1-2). Accordingly, in order to accurately determine the load components Fx and Fz acting on the road surface, correction needs to be made by the use of braking force determined, and the technique such as disclosed in the previously described patent documents are suggested.

However, where the sensor is separately provided for detecting the braking force, not only are wiring and a processing circuit required additionally, but also a structure for providing a detection site is required additionally, and, therefore, inconveniences undesirable to driving components tend to occur such as, for example, increase of the weight.

In each of the embodiments of the present invention that will be described hereinafter, by minimizing the influence of the brake with a construction as simplified as possible, the road surface load can be accurately detected even during the braking operation.

In this embodiment, as a sensor for detecting a load acting on a vehicle wheel in various directions, the sensor units 20 shown in FIGS. 2 to 6 are employed. While the details of each of the sensor units 20 will be described later, each of the sensor unit 20 is made up of a strain generation member 21 fixed to the outer member 1 through three contact fixing segments 21a best shown in FIG. 5, and two strain detection elements 22 (22A and 22B) fitted to the strain generation member 21 for detecting strains occurring in the strain generation member 21. The signal processor 31 shown in FIG. 1 performs an estimation and calculation process with the use of an added value and amplitudes of signals from the two strain detection elements 22.

The load detecting sensor referred to above is not necessarily limited to that employed in the practice of the embodiment shown in and described with reference to FIGS. 2 to 6, but a displacement sensor (such as, for example, an eddy current sensor, a magnetic sensor, or a reluctance sensor) may be mounted on a stationary member, which is one of the outer member 1 and the inner member 2, and a detection target may be disposed on a rotatable ring so that a relative displacement amount between the outer member 1 and the inner member 2 may be determined and, then, from the relationship between the load and the displacement, which have been determined beforehand, the applied load can be determined. Also, the sensor may not be the one that measures the displacement directly, but an indirect displacement measuring system such as disclosed in the patent document 2 referred to previously may be employed. In other words, the construction according to the embodiment now under discussion is applicable to the use of the load sensor of a system which indirectly or directly detects the force acting between the inner member 2 and the outer member 1 of the bearing device by the sensor provided on the stationary member and then estimating the input load by means of a calculation.

It is to be noted that in order to calculate each of the loads Fx, Fy and Fz in three directions, that is, X, Y and Z directions or the moment load in the respective direction, a load detector equipped with a calculation processing structure which utilizes at least three sets of sensor information (output signals of the sensor) is needed. In other words, the load detector of a structure provided with a load calculation unit 30 which generates a sensor signal vector S (={S0, S1, ..., Sn}), which has been extracted by processing a plurality of sensor signals as necessary and executes a load estimation calculation with the use of the sensor signal vector S to determine an input load F (={Fx, Fy, Fz, ...}) is needed.

In the load detector of the structure discussed above, within a region in which a linear approximation establishes, by determining a coefficient M and an offset Mo by means of a numerical analysis and/or experiments so that the relational equation of F=M·S+Mo may be satisfied, the load estimation calculation process is accomplished.

Where the brake provided in the vehicle wheel as hereinbefore described is operating, the influence of the brake is superposed on the sensor signal detected at the bearing assembly and, as hereinbefore described, a problem arises that a value different from the road surface load which is desired to be originally detected may be outputted as a result of calculation. Because of it, in the load calculating equation determined as hereinbefore described, no accurate estimated load can be calculated when the brake is operating.

In view of the above, in the practice of the embodiment now under discussion, in addition to the ordinary calculation processing method in which determination is made under the brake OFF state, a structure is employed in which a load calculation processing function for the brake ON state is installed so that switching may be made from the ordinary load calculation processing method in dependent on the state of the brake.

In the embodiment shown in FIG. 1, in the load calculation unit 30, the brake state is inputted as a signal indicative of the brake ON/OFF from the vehicle to the load calculator 32 and the load calculation process is thereby switched. In other words, even under the brake ON state, the desired road surface load value comes to be accurately calculated because the calculation processing method, in which an influential component of the brake, which superposes on the sensor signal, is taken into consideration is applied.

The load calculator 32 referred to above is operable to calculate the load Fx in the forward and rearward direction of the wheel support bearing assembly, the axially acting load Fy and the vertically acting load Fz, or the moment loads in the respective directions, and for those calculations, a calculating process utilizing at least three or more sensor information is needed.

In other words, in the signal processor 31 referred to previously, the sensor signal vector S (={S0, S1, . . . , Sn}), which has been extracted from the inputted sensor output signals by means of the processing as needed, is generated. Using this sensor signal vector, the load calculator 32 execute the load calculation to determine the working load F (={Fx, Fy, Fz, . . . }). The sensor signal vector S referred to above and hereinafter represents the average value or the amplitude value generated by the signal processor 31 for each of the sensor units 20 referred to hereinbefore.

In the calculating construction described above, in order to enable the calculation process in the load calculator 32, the relational equation of F=M·S+Mo as the arithmetic expression is utilized by the load calculator 32 and, within the region in which the linear approximation establishes, the coefficient M and the offset Mo are determined by means of the numerical analysis and/or the experiments so as to satisfy this relational equation.

As described previously, when the brake provided in the vehicle wheel is operating, the sensor signal detected in the bearing assembly is superposed with the influence of the brake and the value different from the road surface load that is desired to be originally detected is outputted from the load calculator 32. For this reason, no accurate estimated load can be calculated.

In view of the above, in the practice of this embodiment now under discussion, in the load calculator 32, in addition to the ordinary arithmetic expression determined by the brake OFF state, another arithmetic expression for the brake ON state is prepared and those two arithmetic expressions are selectively used in dependence on the brake ON or OFF state. As hereinabove described, information on the brake state is inputted as a brake ON or OFF signal from the vehicle side, which is outside, and in dependence thereon the arithmetic expression that performs the calculation process is switched. In other words, even during the brake ON state, since the calculation process, in which the influence component of the brake that is superposed on the sensor output signal is taken into consideration, is applied, the desired road surface load value comes to be accurately calculated. It is to be noted that in the load calculator 32, calculation processes for the brake ON state and the brake OFF state, respectively, may be simultaneously performed so that in dependence on the brake state signal inputted which one of results of those calculations should be outputted may be selected in dependence on the brake state signal inputted.

Figure 8:
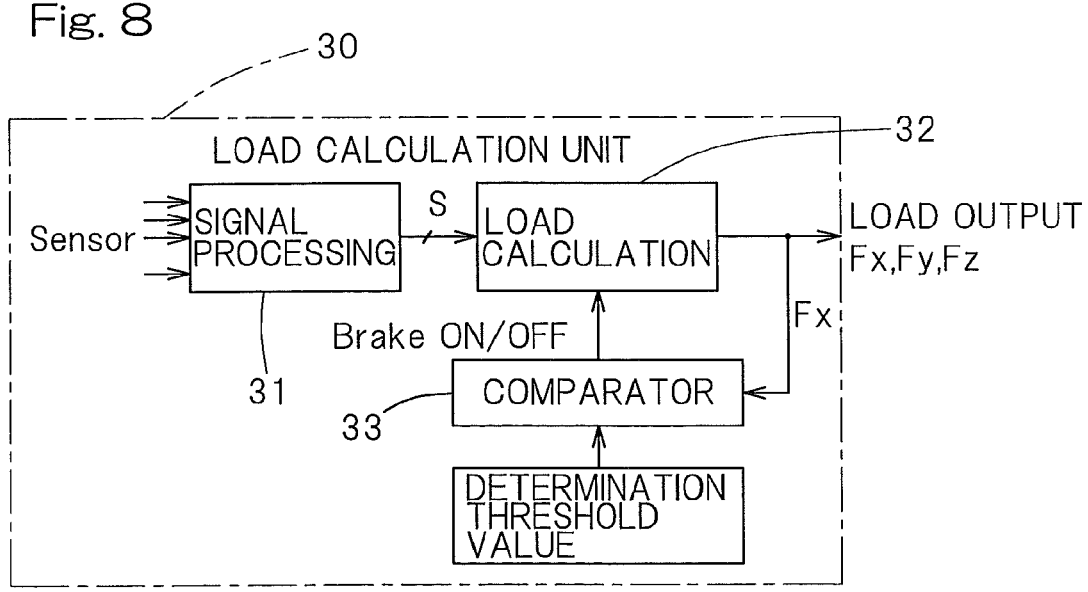
FIG. 8 is a block diagram showing another structural example of a load calculator.

FIG. 8 illustrates another example of the construction of the load calculation unit 30. In this constructional example, no brake information is inputted from the vehicle. In such case, the load Fx in the forward and rearward direction of the wheel support bearing assembly, which is a result of the calculation performed in the load calculator 32 is compared with a predetermined threshold value with the use of a comparator 33 and, from a result of such comparison, the brake state is determined. In such case, in the load calculator 32, the load calculating processes for the brake ON and OFF states, respectively, may be simultaneously performed and, with the use of the value (the value of one of the brake ON or OFF state or the values of the both) of the load Fx in the forward and rearward direction of the wheel support bearing assembly so obtained, whether or not it is in the brake state may be determined, followed by selectiing and outputting a proper calculation result. It is to be noted that where the value of the both is used to determine, since it becomes a combination of respective values of the both, an effect that the accuracy of determination is increased can be obtained. By this construction, even under a condition no brake information is provided for from the vehicle, the accurate load estimated value can be calculated through the determination of the brake state.

Figure 9:
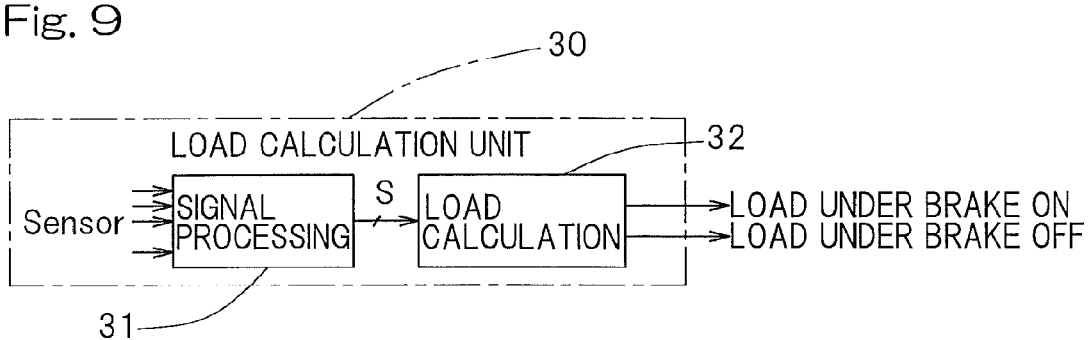
FIG. 9 is a block diagram showing a further structural example of the load calculator.

FIG. 9 illustrates a further example of construction of the load calculation unit 30. In this constructional example, two load calculations respectively for the brake ON state and the brake OFF state are carried out in the load calculator 32 and determination of which one of the calculation results is to be used is carried out on the side of the vehicle (for example, the ECU) which utilizes the signal.

The arithmetic expression used for the brake ON state can be prepared based on the arithmetic expression determined under the brake OFF state. A method of calculating that arithmetic expression will be described with particular reference to FIG. 7.

From the equation (3) and the equations (1-1) and (1-2), the road surface load desired to be detected will be such as shown in the following equation:

$$Fx = Fxb/(1+\alpha \cdot \sin\theta) + (Tdrive/RB) \cdot \sin\theta/(1+\alpha \cdot \sin\theta) \quad (4\text{-}1)$$

$$Fz = Fzb + Fxb \cdot \alpha \cdot \cos\theta/(1+\alpha \cdot \sin\theta) - (Tdrive/RB) \cdot \alpha \cdot \cos\theta/(1+\alpha \cdot \sin\theta) \quad (4\text{-}2)$$

where $\alpha = Rw/RB$: radius ratio.

In this example, if the following assumptions are made:

$$F\text{drive} = T\text{drive}/RB \quad (4\text{-}3)$$

$$A = 1/(1+\alpha \cdot \sin\theta) \quad (4\text{-}4)$$

$$B = A \cdot \sin\theta \quad (4\text{-}5),$$

and $$C = A \cdot \alpha \cdot \cos\theta \quad (4\text{-}6)$$

the equation (4-1) and (4-2) will become as follows:

$$Fx = A \cdot Fxb + B \cdot F\text{drive} \quad (5\text{-}1)$$

and $$Fz = Fzb + C \cdot Fxb - C \cdot F\text{drive} \quad (5\text{-}2).$$

It is assumed that under the brake OFF state, the bearing loads Fxb and Fzb can be calculated as follows with the sensor signal vector S inputted and with the use of a calculation coefficient matrix M and an offset matrix Mo:

$$Fxb = Mx \cdot S + Mox \quad (6\text{-}1)$$

$$Fzb = Mz \cdot S + Moz \quad (6\text{-}2)$$

Then, the arithmetic expressions (5-1) and (5-2) for the brake ON state will be expressed as follows:

$$Fx = A \cdot Mx \cdot S + A \cdot Mox + B \cdot F\text{drive} \quad (7\text{-}1)$$
$$= Mx' \cdot S + Mox' + B \cdot F\text{drive}$$

-continued $$Fz = (Mx + C \cdot Mx) \cdot S + (Moz + C \cdot Mox) - C \cdot Fdrive \quad (7\text{-}2)$$
$$= Mz' \cdot S + Moz' - C \cdot Fdrive$$

Where Fdrive can approximate zero (0), the equations (7-1) and (7-2) will become:

$$Fx = A \cdot Mx \cdot S + A \cdot Mox = Mx' \cdot S + Mox'' \quad (8\text{-}1)$$

$$Fz = (Mz + C \cdot Mx) \cdot S + (Moz + C \cdot Mox) = Mz' \cdot S + Moz'' \quad (8\text{-}2)$$

and are expressed in the form of the equations (6-1) and (6-2) with the calculation coefficient matrix M replaced by M'.

The calculation coefficient matrix M' for the brake ON state can be calculated by the following equation converted with the use of the calculation coefficient matrix M for the brake OFF state:

$$Mx' = A \cdot Mx \quad (9\text{-}1)$$

$$Mox' = A \cdot Mox \quad (9\text{-}2)$$

$$Mz' = Mz + C \cdot Mx \quad (9\text{-}3)$$

$$Moz' = Moz + C \cdot Mox \quad (9\text{-}4)$$

In this instance, the calculation coefficient matrix M is determined so that the load calculation process for the brake OFF state can be performed by the equations (6-1) and (6-2). In other words, when the relation between the sensor signal and the detected load has been determined by means of the numerical analysis and/or experiments and, within the range in which at least linear approximation relation establishes, a condition is established in which using the equations (6-1) and (6-2) the estimated load can be calculated. It is to be noted that in the case of the non-linear characteristic, a method may be employed in which while a calculation region is divided into some linear ranges and is then approximated.

Where a target wheel for which the load is measured is a driven wheel, since there is no drive shaft, there is no driving force Fdrive resulting from the drive torque (Fdrive=0). Accordingly, the calculation coefficient matrix may be converted as seen from the equations (9-1) to (9-4) and, by means of the arithmetic expressions (8-1) and (8-2) which use it, the load calculating process for the brake state may be executed.

Figure 10:
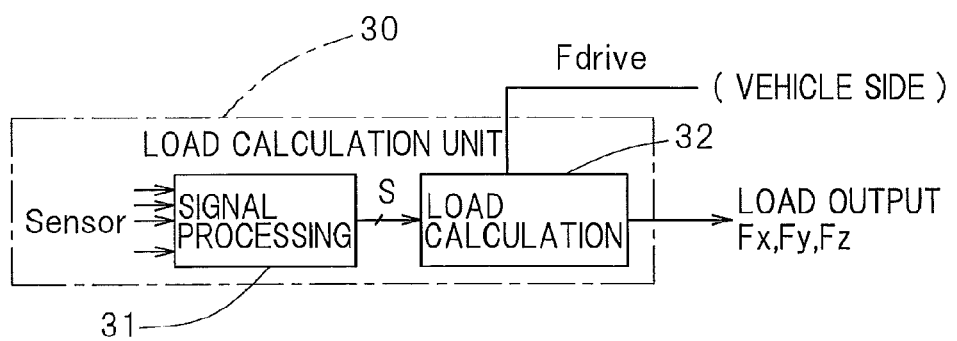
FIG. 10 is a block diagram showing a still further structural example of the load calculator.

On the other hand, in the case where the target wheel is a drive wheel, it may occur that an input torque Tdrive from the drive wheel comes even during the brake operation and, at that time, an error corresponding to the terms (B·Fdrive) and (−C·Fdrive) appearing in the respective equations (7-1) and (7-2) tend to occur. Such a condition corresponds to the cases in which the brake is operated while the drive torque is inputted from the drive source, and in which a strong engine brake, or a regeneration brake in the case of an electrically powered vehicle, is operated. In such case, calculation of the value of (Fdrive=Tdrive/RB) may be made based on the condition of the engine brake torque or the regeneration torque and, then, using this value, an output value of the load sensor may be corrected. FIG. 10 illustrates a still further example of construction of the load calculation unit 30 that can accommodate the above described conditions. In other words, in the load calculation unit 30 shown in FIG. 10, the value of Fdrive calculated on the side of the vehicle is inputted to the load calculator 32 and a correction calculation is executed by the load calculator 32.

Figure 11:
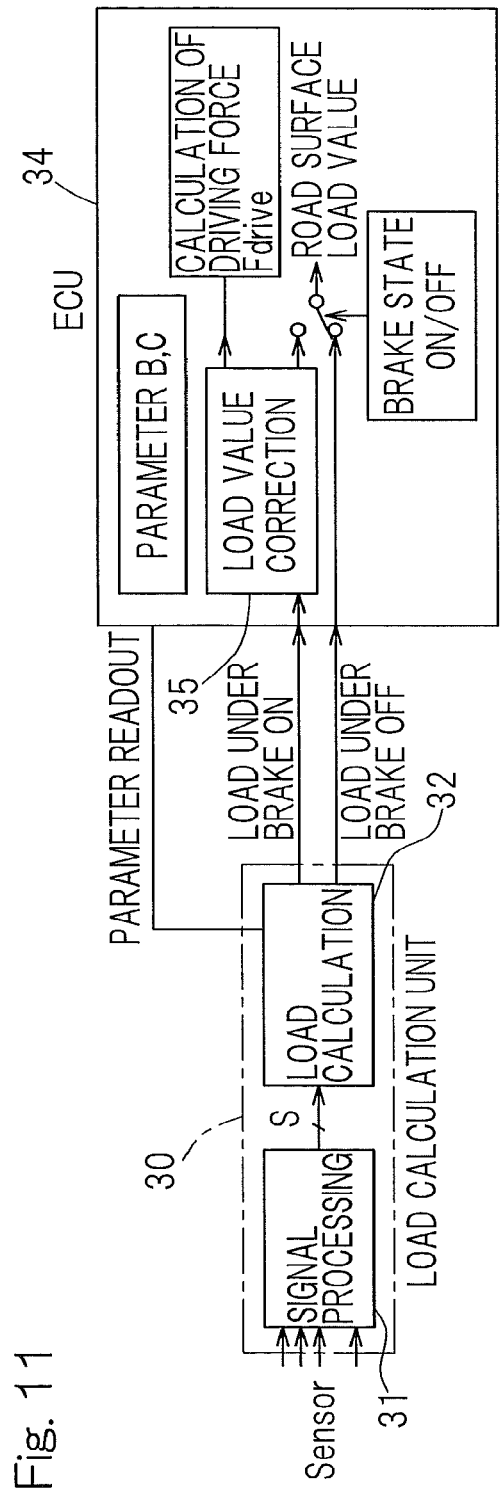
FIG. 11 is a block diagram showing a yet further structural example of the load calculator.

FIG. 11 illustrates a yet further example of construction of the load calculation unit 30. In this constructional example, the correction calculation performed in the load calculator 32 in the case of the modification shown in and described with reference to FIG. 10 is performed in a load value correction unit 35 on the side of the ECU 34 of the vehicle. In this instance, the previously described parameters B and C required in the correction calculation are obtained from the load calculator 32 and are then stored on the side of the ECU 34 of the vehicle so that the load correction on load data for the brake ON state can be carried out by the load value correction unit 35.

Figure 7:
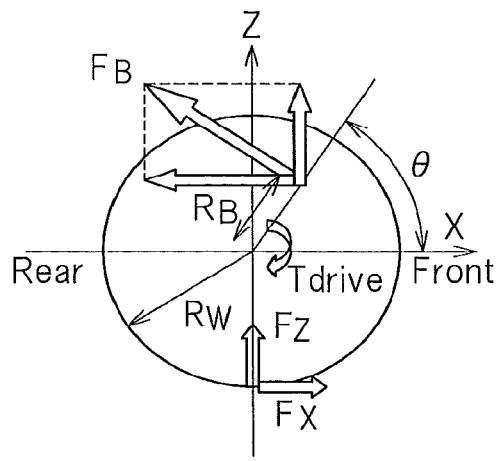
FIG. 7 is a schematic diagram used to explain an influence brought about by a braking force on a detected load.

It is to be noted that with respect to the parameters α and θ, employed in the arithmetic expression performed with reference to FIG. 7, although approximate values thereof can be determined from the position of a brake caliper, since in practice an error tends to occur, a calculation outputs for the brake ON state and the brake OFF state, respectively, may be verified by means of a series of experiments so that the error can be adjusted to a minimum value.

Effects delivered from the first embodiment of the present invention described hereinbefore will now be summarized as set forth below.

Since the load for the brake ON state can be detected accurately, the brake control·vehicle posture control is possible and, therefore, the safety and the amenity can be enhanced.

Since without the sensor being separately provided the load condition during the braking can be detected, a load sensing function can be mounted in a limited space for a suspension system of the vehicle without the weight, the cost and the number of wirings being increased.

Since no change in structure is required for accommodating the caliper, there is no need to manufacture separately bearings of shapes, which are specially designed in dependence on mounting positions such as, for example, left and right of the vehicle.

Since neither additional sensors nor change in structure is required, a mere change of the load calculation coefficient is sufficient even when the mounting position of the caliper and the structure thereof are different. Also, standardization and simplification of component parts can be appreciated and, therefore, reduction in manufacturing cost and facilitation of maintenance servicing can be realized.

Figure 3:
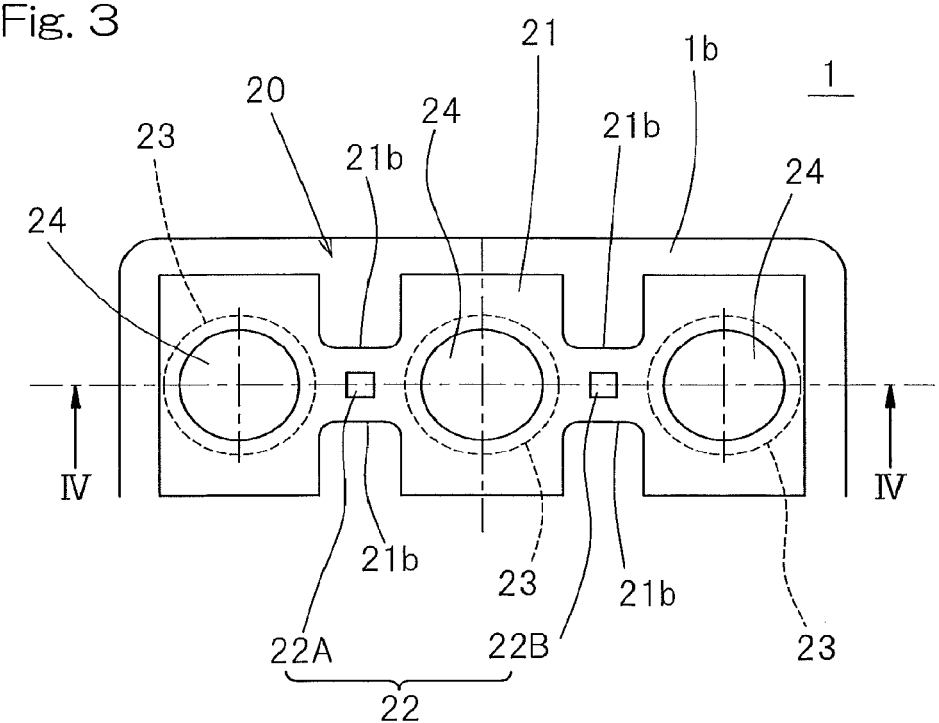
FIG. 3 is an enlarged top plan view showing a sensor unit employed in the sensor equipped wheel support bearing apparatus.
Figure 4:
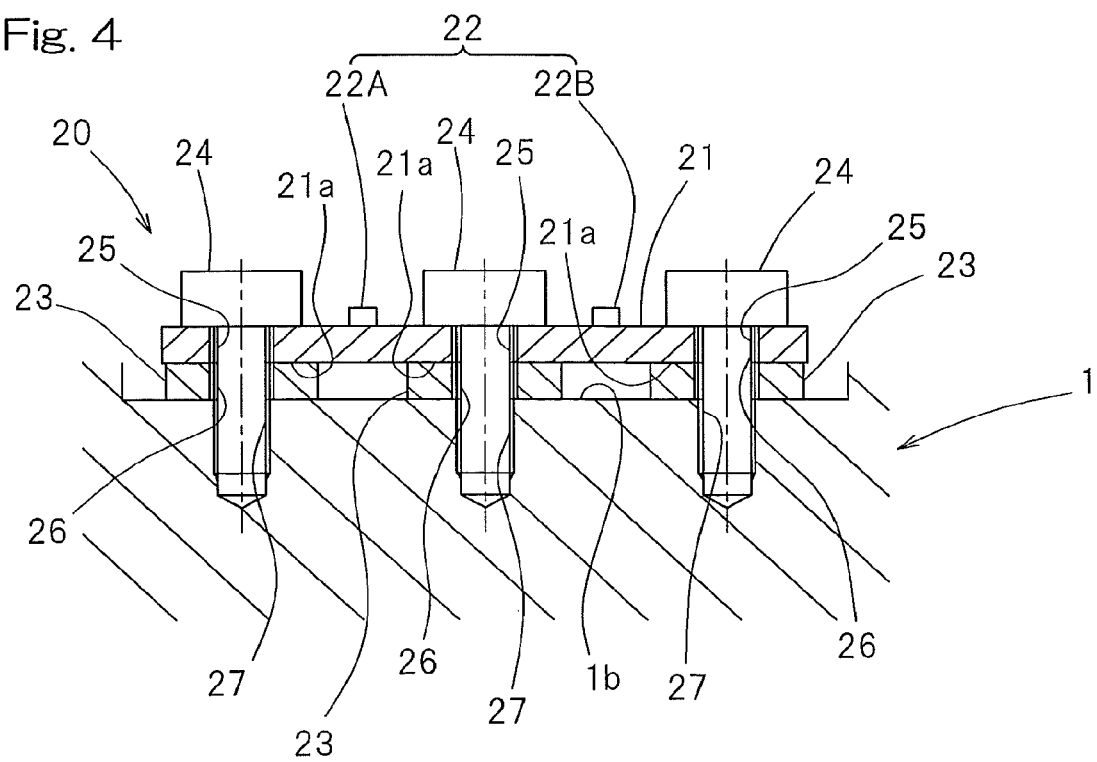
FIG. 4 is a cross sectional view taken along the line IV-IV in FIG. 3.

In the next place, examples of the sensor unit 20 and the signal processor 31 both shown in FIG. 1 will be discussed. Each of the sensor units 20 provided at the respective circumferential locations as shown in FIG. 2 includes the strain generation member 21 and the two strain detection elements 22 mounted on the strain generation member 21 for detecting the strains induced in the strain generation member 21 as shown in FIGS. 3 and 4 which show an enlarged top plan view and an enlarged sectional view, respectively. The strain generation member 21 is in the form of a thin plate member, 2 mm or smaller in thickness, made of a metallic material such as, for example, steel capable of undergoing an elastic deformation and of a stripe shape of uniform width over the entire length in planar view. The strain generation member 21 has the three contact fixing segments 21a that are fixed in contact with the outer diametric surface of the outer member 1 through associated spacers 23. Those three contact fixing segments 21a are disposed in a row extending in a direction conforming to the lengthwise direction of the strain generation member 21. One strain detection element 22A of two strain detection elements 22 is, as shown in FIG. 4, disposed intermediate between the left contact fixing segment 21a and the intermediate contact fixing segment 21a, and the other strain detection element 22B of the two strain detection elements 22 is disposed intermediate between the intermediate contact fixing segment 21a and the right contact fixing segment 21a. As shown in FIG. 3, a cutout portion 21b is formed at two locations in opposite side edge portions thereof and corresponding to respective site of placement of each of the strain detection elements 22A and 22B. This cutout portion 21b has corner areas, each representing an arcuate shape. The strain detection element 22 (22A and 22B) detects a circumferentially induced strain around the cutout portion 21b.

It is to be noted that the strain generation member 21 is preferably of a type not undergoing a plastic deformation even under a condition in which, as an external force acting on the outer member 1, which is a stationary member, or a working force acting between the tire and the road surface, the maximum expected force is applied thereto. The reason therefore is that once the elastic deformation occurs, a deformation of the outer member 1 will not be transmitted to the sensor unit 20, thus adversely affecting the measurement. The maximum expected force referred to above is, for example, a maximum force of a range in which the wheel support bearing apparatus 100 will not be impaired even through such force acts thereon, but in which a normal function of the wheel support bearing apparatus 100 can be resumed when such force is removed.

The sensor unit 20 referred to above is such that the three contact fixing segments 21a of the strain generation member 21 thereof are disposed at respective positions which occupy same demensions axially of the outer member 1 with each of the contact fixing elements 21a spaced from each other in a direction circumferentially of the outer member 1 and those contact fixing segments 21a are fixed to the outer diametric surface of the outer member 1 through the spacers 23 by means of bolts 24. Each of the bolts 24 referred to above is inserted from a bolt insertion hole 25, defined in the associated contact fixing segment 21a so as to extend radially, through a bolt insertion hole 26 in the corresponding spacer 23 and is firmly threaded into a threaded hole 27 defined in an outer peripheral portion of the outer member 1. Thus, with the contact fixing segment 21 fixed to the outer diametric surface of the outer member 1 through the spacers 23, portions of the strain generation member 21 of a thin plate-like shape are held in position spaced from the outer diametric surface of the outer member 1 and, therefore, the strain induced deformation occurring around the adjacent cutout portions 21b can be readily facilitated.

As the axial position at which the contact fixing segment 21 is disposed, the embodiment now under discussion chooses an axial position which is in the vicinity of the rolling surface 3 of an outboard side row in the outer member 1. It is to be noted that the wording "in the vicinity of the rolling surface 3 of the outboard side row" is intended to encompass a region ranging from a middle position of the rolling surfaces on an inboard side row and the outboard side row to a site of the rolling surface 3 on the outboard side row. For enabling the sensor unit 20 to be stably fixed to the outer diametric surface of the outer member 1, a flat area 1b is formed at a portion of the outer diametric surface of the outer member 1 where the spacer 23 is fixed in contact therewith.

Figure 5:
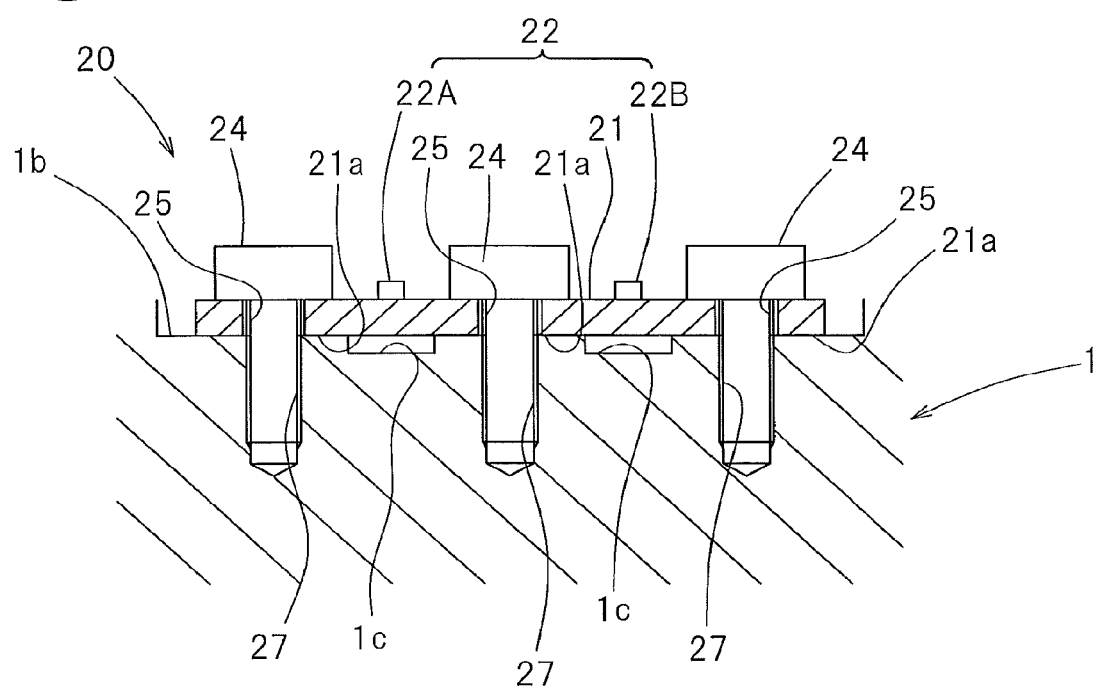
FIG. 5 is a longitudinal sectional view showing an example of another installation of the sensor unit.

Other than the above, as shown in a longitudinal sectional view in FIG. 5, a groove 1c may be provided at each of the intermediate portions between respective sites on the outer diametric surface of the outer member 1 where the three contact fixing segments 21a of the strain generation member 21 are fixed, the use of the spacers 23 may be dispensed with, and portions of the strain generation member 21, where the cutout portions 21b are located in the strain generation member 21, may be spaced from the outer diametric surface of the outer member 1.

For the strain generating element 22 (22A and 22B), any of various types may be employed. For example, the strain detection element 22 may be constructed of a metallic foil strain gauge. In such case, fixing is generally accomplished by means of bonding with respect to the strain generation member 21. Also, the strain detection element 22 can be formed on the strain generation member 21 in the form of a thick film resistor element.

In the sensor equipped wheel support bearing apparatus referred to hereinabove, in the signal processor 31 of the load calculation unit 30, as the output signal of each of the sensor units 20, the average value and/or the amplitude value, for example, of the signals of the two strain detection elements 22A and 22B in those sensor units 20 are extracted. The average value referred to above is obtained by summing the signals of the two strain detection elements 22A and 22B. Also, the amplitude value referred to above is an amplitude value calculated with the use of the difference between the signals of the two strain generating elements 22A and 22B.

Figure 6:
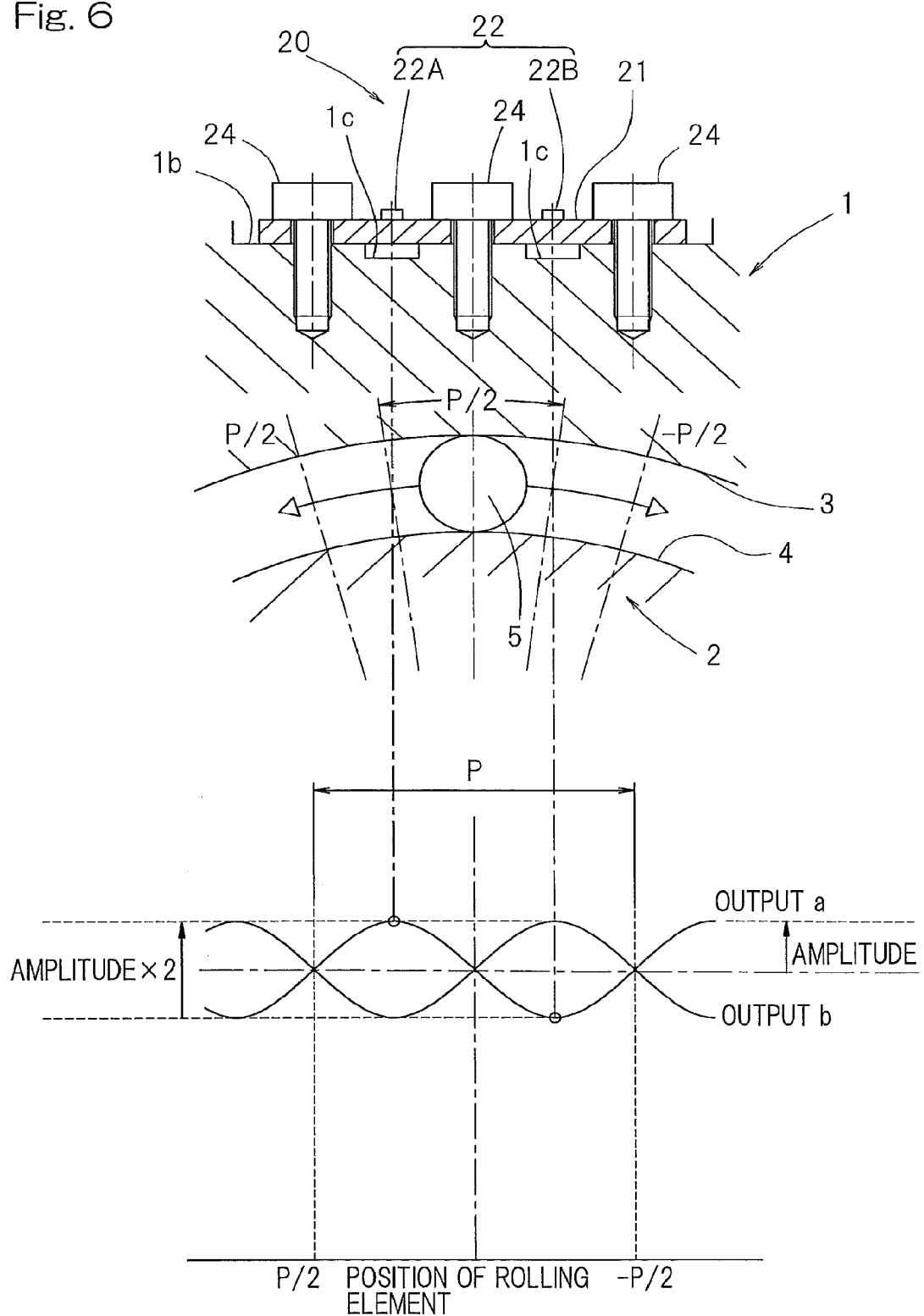
FIG. 6 is an explanatory diagram showing an influence brought about by a rolling element position relative to an output signal of the sensor unit.

Since the sensor unit 20 is provided at the axial position of the outer member 1 which is in the vicinity of the rolling surface 3 on the outboard side row, the signals a and b of the strain detection elements 22A and 22B are, as shown in FIG. 6, affected by the rolling elements 5 then passing in the vicinity of the site of installation of the sensor unit 20. Also, even at the halt of the bearing assembly, the signals a and b of the strain detection elements 22A and 22B are affected by the position of the rolling elements 5. In other words, when the rolling element 5 moves past a position closest to the strain detection elements 22A and 22B in the sensor unit 20 (or the rolling element 5 assumes at such position), the signals a and b of the strain detection elements 22A and 22B attain the maximum values and, as the rolling element 5 moves away from such position as shown in an upper portion and an intermediate portion of that figure (or, when the rolling element 5 assumes a position spaced from such position), the signals lower. During the rotation of the bearing assembly, the rolling elements 5 successively move in the vicinity of the site of installation of the sensor unit 30 at intervals of a predetermined arrangement pitch P and, therefore, the signals a and b of the strain detection elements 22A and 22B represent respective waveforms approximate to the sinusoidal wave that cyclically change with one cycle length of the arrangement pitch P of the rolling elements 5 as shown in a lower portion of that figure. Also, the signals a and b of the strain generating elements 22A and 22B are affected by temperature and/or by hysteresis brought about by slippage between the knuckle 16 and the vehicle body fitting flange 1a (shown in FIG. 1).

In this instance, in the signal processor 31 best shown in FIG. 1, the sum of the signals a and b of the two strain generating elements 22A and 22B is rendered to be the average value, the amplitude value is extracted with the use of the difference of the signals a and b of the two strain detection elements 22A and 22B, and those values are rendered to be the output signal of the sensor unit 20. Accordingly, the average value will become a value from which a varying component resulting from the passage of the rolling element 5 has been cancelled. Also, the amplitude value will become a value in which the temperature dependent influence and the influence brought about by the slippage between the knuckle and the flange surface, which appear in each of the signals a and b of the two strain detection elements 22A and 22b, have been set off. Accordingly, when the average value and the amplitude value are rendered to be the output signal of the sensor unit 20 and this is used as a variable in the calculation that takes place in the load calculator 32 (best shown in FIG. 1)

that follows the signal processor 31, the load acting on the wheel support bearing apparatus 100 and the tire tread can be further accurately calculated and estimated.

In FIG. 6, of the three contact fixing segments 21a that are arranged in the circumferential direction of the outer diametric surface of the outer member 1 which is the stationary member, the two contact fixing segments 21a positioned on opposite ends of the arrangement thereof, are spaced from each other a distance that is set to be equal to the arrangement pitch P of the rolling elements 5. In this case, the distance in the circumferential direction between the two strain detection elements 22A and 22B, which are disposed at respective intermediate positions of the neighboring contact fixing segments 21a, is equal to about ½ of the arrangement pitch P of the rolling elements 5. As a result, the signals a and b of the two detecting elements 22A and 22B come to have a phase difference of approximately 180° and the average value, which is determined as the added value thereof, will become a value from which the varying component resulting from the passage of the rolling element 5 has been cancelled. Also, the amplitude value that is determined with the use of that difference value will be the value in which the influence of temperature and/or the influence resulting from the slippage between the knuckle and the flange surface and others have been set off.

It is to be noted that in FIG. 6, the distance in the circumferential direction between the two strain detection elements 22A and 22B has been shown and described as to be equal to approximately ½ of the arrangement pitch P of the rolling elements 5 by setting the distance between the contact fixing segments 21a to a value equal to the arrangement pitch P of the rolling elements 5 and disposing the strain detection elements 22A and 22B at respective intermediate positions of the neighboring contact fixing segments 21a. Alternatively, the distance between the two strain detection elements 22A and 22B in the circumferential direction may be directly set to a value equal to ½ of the arrangement pitch P of the rolling elements 5. In such case, the distance between the two strain detection elements 22A and 22B in the circumferential direction may be set to a value equal to $\{½+n\}$ times the arrangement pitch P of the rolling elements 5, wherein n represents an integer. Even in this case, the average value, which can be determined as the added value of the signals a and b of the strain detection elements 22A and 22B, will become a value from which the varying component resulting from the passage of the rolling elements 5 has been cancelled and the amplitude value, which is obtained by the use of the difference value, will be a value in which the influence of temperature and/or the influence of slippage between the knuckle and the flange surface and others have been cancelled.

Figure 12A:
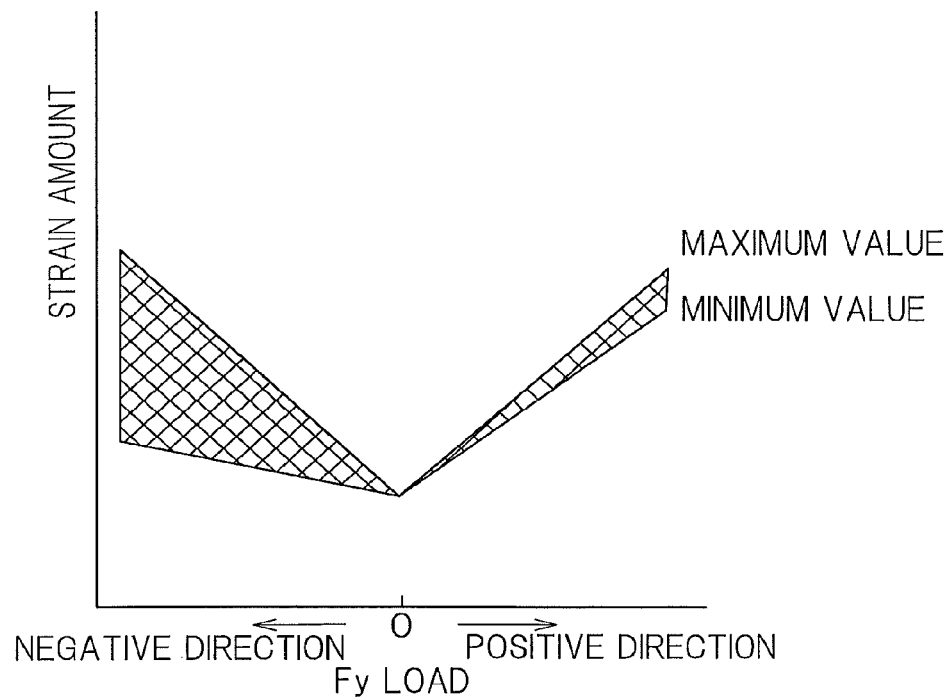
FIG. 12A is a chart showing the relationship between a sensor output signal amplitude at an outer member outer diametric surface top surface area and an axially acting load.
Figure 12B:
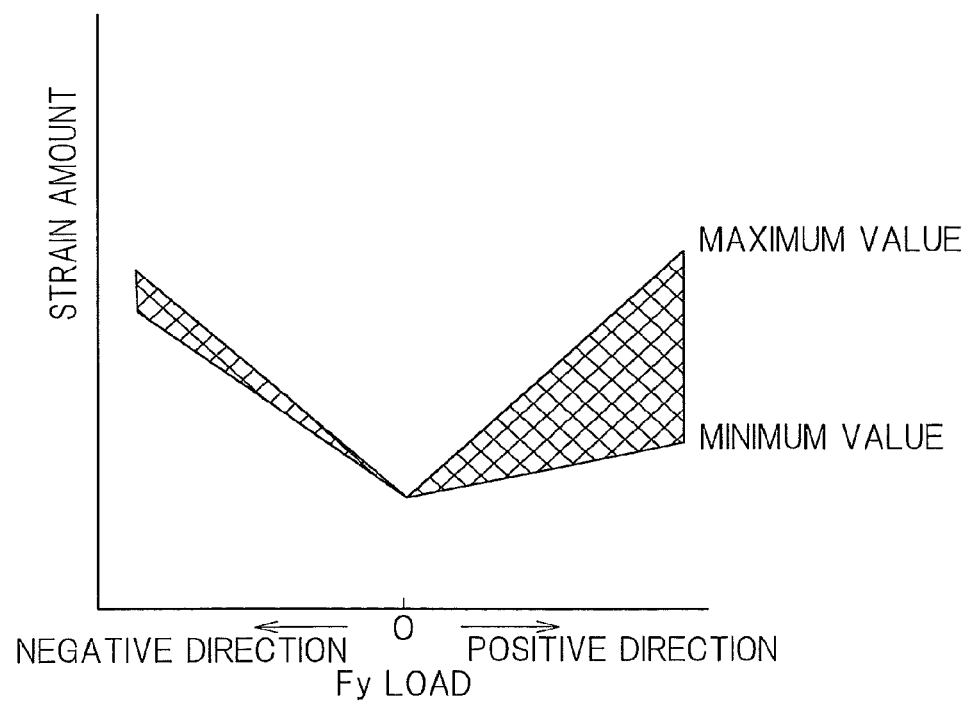
FIG. 12B is a chart showing the relationship between a sensor output signal amplitude at an outer diametric surface lower surface area thereof and an axially acting load.

In calculating the axially acting load Fy, by calculating the difference value of respective amplitude values of the output signals of the two sensor units 20 out of the plurality of the sensor units 20, which are disposed in face to face relation with each other and spaced a phase difference of 180° in the circumferential direction of the outer member 1, the direction of the axially acting load Fy can be determined from this difference value. For example, as the two sensor units 20 referred to above, the sensor units 20 which are disposed above and below in face to face relation to each other as shown in FIG. 2 may be selected. FIG. 12A illustrates the output signal of the sensor unit 20 disposed at the upper surface area of the outer diametric surface of the outer member 1 and FIG. 12B illustrates the output signal of the sensor unit 20, best shown in FIG. 2, which is disposed at the lower surface area of the outer diametric surface of the outer member 1. In those figures, the axis of abscissas represents the axially acting load Fy and the axis of ordinates represents the amount of strain in the outer member 1, that is, the output signal of the sensor unit 20 best shown in FIG. 2, noting that the maximum value and the minimum value stand for those of the previously discussed output signal. From those figures, it will readily be understood that if the axially acting load Fy is in a positive direction, the load of each of the rolling elements 5 becomes small at an upper surface area of the outer diametric surface of the outer member 1 and large at a lower surface area of the outer diametric surface of the outer member 1. In contrast thereto, it will also readily be understood that if the axially acting load Fy is in a negative direction, the load of each of the rolling elements 5 becomes large at the upper surface area of the outer diametric surface of the outer member 1 and small at the lower surface area of the outer diametric surface of the outer member 1. This makes it clear that the difference value referred to above is indicative of the direction of the axially acting load Fy.

As discussed above, according to the sensor equipped wheel support bearing apparatus according to the embodiment now under discussion, since at least one (four, in this instance) of the sensor units 20 is provided as a sensor for detecting the load applied to the wheel support bearing apparatus 100, the output signal of each of the sensor units 20 is processed in the signal processor 31 to generate the signal vector S, the load applied to the vehicle wheel is calculated by the load calculator 32 with the use of the resultant signal vector S, and the load calculation processing nit 32 has a function of determining the presence or absence (the brake ON or OFF state, in this instance) of the predetermined state of the vehicle, which would affect the result of calculation of the load, so two types of calculations appropriate to the presence or absence of the predetermined state can be performed, correction can be made to avoid the detected load at a bearing region from being affected by the predetermined state of the vehicle such as occurring at the time of the braking operation to thereby enable the accurate load to be detected even when the state of the vehicle is at the predetermined state such as the occurrence of the braking operation.

When a load acts between the wheel tire and the road surface, the load is applied also to the outer member 1 which is the stationary member of the wheel support bearing apparatus 100, resulting in deformation. In the embodiment now under discussion, since the three contact fixing segments 21a of the strain generation member 21 in the sensor unit 20 are fixed to the outer member 1 in contact therewith, a strain occurring in the outer member 1 is, after having been amplified, transmitted easily to the strain generation member 21 and such strain can be detected by the strain detection elements 22A and 22B with high sensitivity.

Also, as shown in FIG. 2, since the sensor unit 20 is provided in four in number and each of the sensor units 20 is disposed four in number on the upper surface area, lower surface area, right surface area and left surface area of the outer diametric surface of the outer member 1 and are equidistantly spaced in a phase difference of 90° in a circumferential direction thereof, it is possible to estimate the vertically acting load Fz, the load Fx acting in the forward and rearward direction and the axially acting load Fy, which act on the wheel support bearing apparatus 100.

Also, although the sensor unit 20 used in the practice of this embodiment has been shown and described as comprised of the strain generation member 21 fixed to the outer diametric surface of the stationary member in contact therewith, and the two strain detection elements 22A and 22B, it may be of a structure provided with one strain detection element in the strain generation member 21, in which case the average value or the amplitude value of a signal of the single strain detection element can be used in the load calculation as a variable.

The other embodiments will be described hereinafter. In the description that follows, component parts similar to those shown and described in connection with the preceding embodiments of the present invention are shown by like reference numerals and, therefore, the details thereof are not reiterated for the sake of brevity. Where only a part of the construction is described, the remaining part of the construction is to be understood as similar to that in the preceding embodiment or embodiments.

Figure 13:
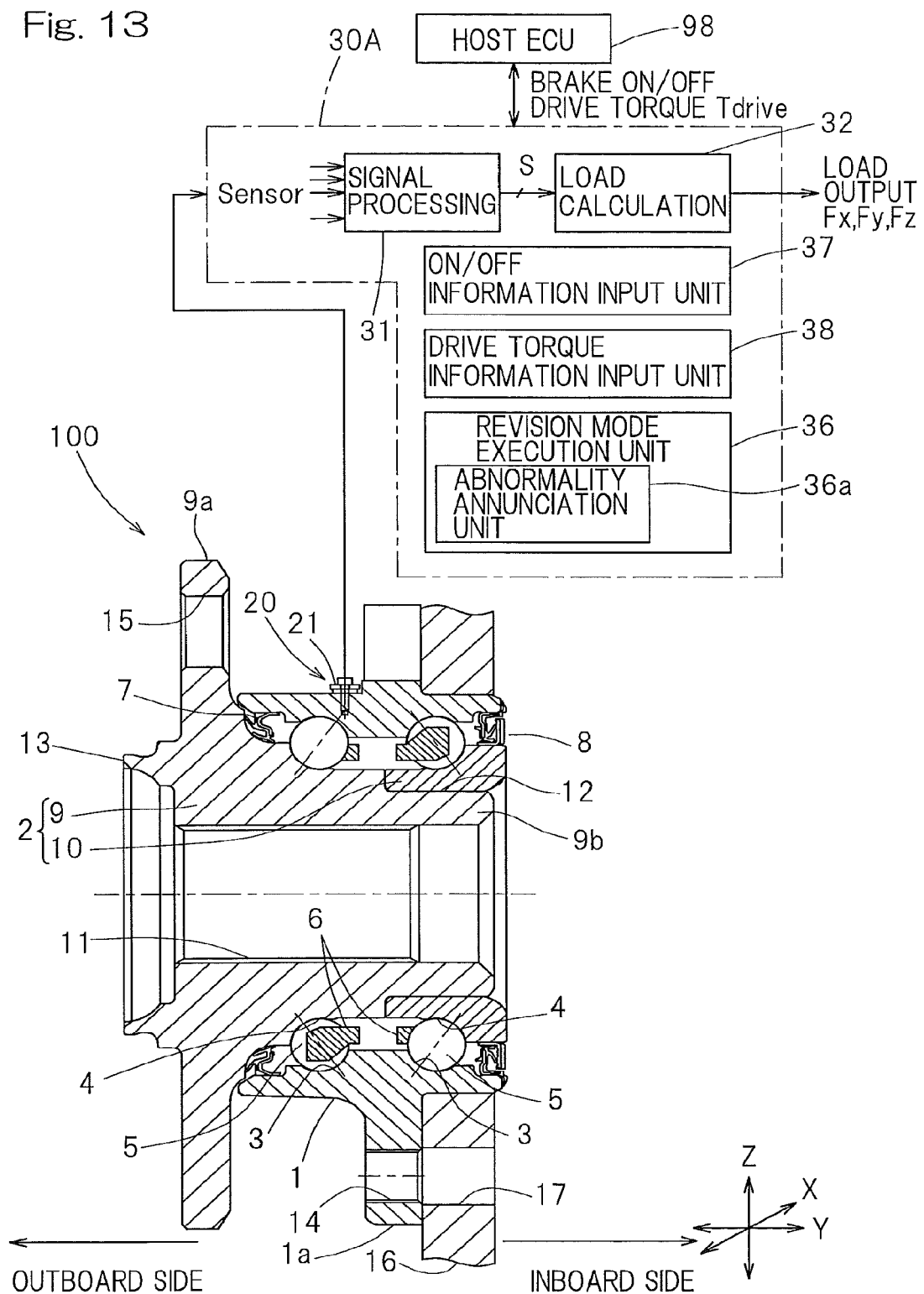
FIG. 13 is a diagram showing a longitudinal sectional view of the sensor equipped wheel support bearing apparatus, designed according to a second embodiment of the present invention, and a block diagram showing the conceptual construction of the detection system therefor.
Figure 14:
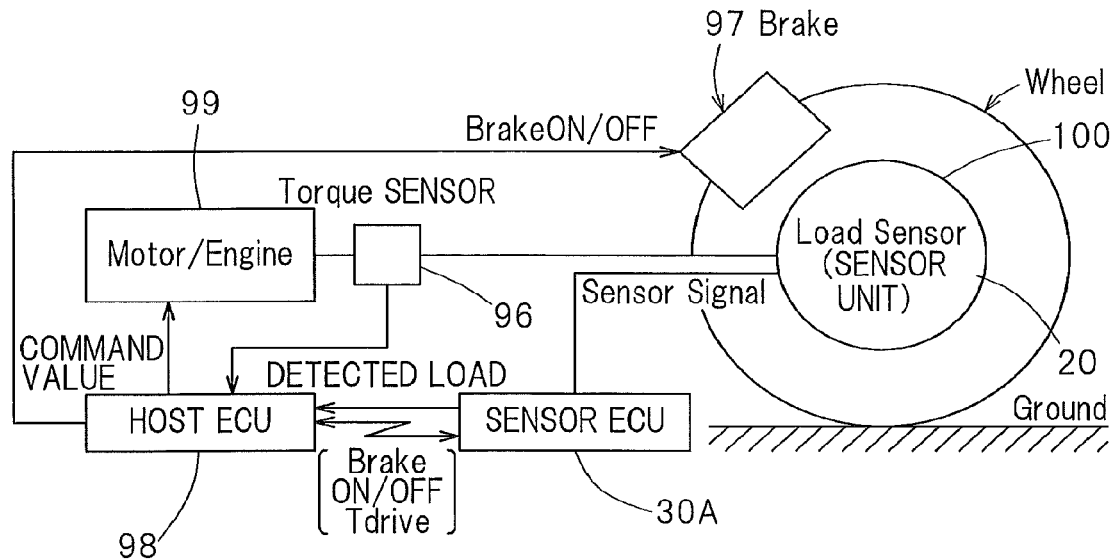
FIG. 14 is a block diagram showing a conceptual construction of a vehicle control system including the detecting system.
Figure 15:
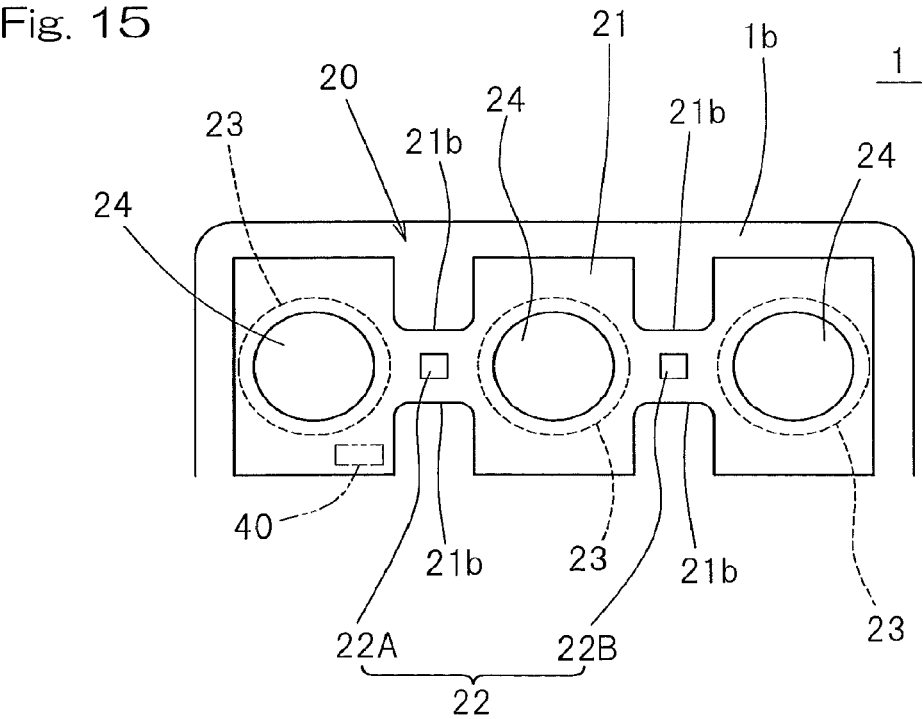
FIG. 15 is an enlarged top plan view showing the sensor unit in the sensor equipped wheel support bearing apparatus.

A second embodiment of the present invention is shown in FIGS. 13 to 15, reference to which will now be made. This second embodiment is similar to the wheel support bearing apparatus best shown in FIG. 1 and designed according to the first embodiment, but differs therefrom in that, in place of the load calculation unit 30 shown in FIG. 1 and employed in the practice of the preceding embodiment, a sensor ECU (electric control unit) 30A having a revision mode execution unit 36 as best shown in FIG. 13 is employed. It is to be noted that FIG. 2, FIGS. 4 to 7 and FIGS. 12A and 12B, reference to which has been made in describing the first embodiment, are applicable to the description of the second embodiment and as they stand, therefore, the details made with reference those figures will not be reiterated in the description that follows.

As best shown in FIG. 13, each sensor unit 20 is connected with the sensor ECU 30A. The sensor ECU 30A includes a signal processor 31 for processing an output signal of each sensor unit 20 to generate a signal vector, a load calculator 32 for calculating from the signal vector the load acting on the vehicle wheel, a revision mode execution unit 36 for checking a result of the calculation performed by the load calculator 32 and others. The signal processor 31, the load calculator 32 and the revision mode execution unit 36 may not necessarily be integrated with the sensor ECU 30A, but may be provided separately from each other. Also, the signal processor 31, the load calculator 32, the revision mode execution unit 36 and the sensor electric unit 30A may be all mounted on the wheel support bearing apparatus 100 or, alternatively, disposed separate from the wheel support bearing apparatus 10 and, for example, in the vicinity a host ECU 98 best shown in FIG. 14, or as a part of the host ECU 98 so that it may function as, for example, a subordinate control unit of an integrated control unit of the host ECU 98.

In the example as shown in FIG. 13, the information on the brake ON or OFF state is inputted, as information from the vehicle which is the outside, for example, as the information directly from a host ECU 98 best shown in FIG. 14 or from the brake, to the load calculator 32. It is to be noted that where the load calculator 32 is provided as a part of the host ECU 98 shown in FIG. 14, the information from the host ECU 98 is inputted to the load calculator 32 from a section of the host ECU 98 which performs a host control on the load calculator 32.

The arithmetic expression for the brake ON state and the arithmetic expression for the brake OFF state, both described hereinbefore in connection with the first embodiment, equally apply to this second embodiment and, by the calculation done by the use of those arithmetic expressions, during the brake ON state, a load component proportional to a braking force FB is outputted from the load calculator 32 after having been added to a road surface load desired. Accordingly, in order to accurately detect the load components Fx, Fy and Fz at the time of braking, it is necessary to know the brake pad position relative to the drive shaft (the radius RB and the angle θ from the x-axis).

FIG. 13 illustrates a conceptual construction of a vehicle control system including the previously described sensor ECU 30A. The sensor ECU 30A is provided with an ON/OFF information input unit 37 for inputting the brake ON or OFF information and a drive torque information input unit 38 for inputting the known drive torque information, in addition to the previously described signal processor 31, the load calculator 32 and the previously described revision mode execution unit 36. The revision mode execution unit 36 is a unit for checking a calculation result calculated by the load calculator 32 based on information inputted through the ON/OFF information input unit 37 and the drive torque information input unit 38. Specifically this revision mode execution unit 36 checks the state of the brake. In this revision mode execution unit 36, an operation to calculate a brake conversion coefficient that represents an influence exerted on the bearing by the brake is carried out. More specifically, the brake conversion coefficient is calculated based on the bearing load FB detected by inputting the known drive torque Tdrive to each vehicle wheel during the state in which the brake is ON.

The operation of the revision mode execution unit 36 takes place after having been switched from the operation of the load calculator 32. Switching to the operation of the revision mode execution unit 36 may be accomplished by, during a vehicle stopped condition, issuing a command from the host ECU 98 on the side of the vehicle directly to the sensor ECU 30A or by automatically switching when the drive torque is applied during the brake ON state. The revision mode execution unit 36 includes an abnormality annunciation unit 36a for presenting a result of detection of the revision mode to a machine such as, for example, the host ECU 98 which is connected with the sensor ECU 30A and annunciating an abnormality detected in the event that the abnormality appears in a sensor operation and/or output torque. Also, the revision mode execution unit 36 has a function of updating a parameter of the brake conversion coefficient, which is stored in the sensor ECU 30A, as necessary in dependence on the result of detection of the revision mode.

The details of the operation under the detecting mode will be described hereinafter. As hereinbefore described, the brake ON/OFF information from the host ECU 98 and the drive torque information Tdrive applied to the wheel shaft are inputted to the sensor ECU 30A through the ON/OFF information input unit 37 and the drive torque information input unit 38 and, also, the sensor information from the sensor unit 20 provided in the bearing is inputted to the sensor ECU 30A. The drive torque Tdrive is a drive torque inputted from the drive shaft referred to previously and shown in FIG. 7, but it may be a torque value detected from the drive shaft by a torque sensor 96 shown in FIG. 14 or, where a drive engine 99 is an electric motor, it may be a value that is estimated from a command value that is outputted to a drive circuit of the electric motor or that can be estimated from an input current value of the electric motor.

In the revision mode execution unit 36, the influence on the bearing load exerted by the input load from the brake caliper 97 best shown in FIG. 14 is detected in reference to the loads Fxb and Fzb calculated by the previously described calculation in the load calculator 32, and the known drive torque Tdrive. In other words, a brake conversion coefficient from the calculation coefficient matrix M, shown in the previously discussed equations (8-1) to (8-4), into the calculation coefficient matrix M' is calculated. Parameters forming this brake conversion coefficient include the radius RB and the angle θ representing the brake caliper position, which may be determined from the following calculation.

From the previously discussed equations (4-3) to (4-6), the bearing loads Fxb and Fzb under a condition in which the vehicle is stopped can be expressed by the following equations:

$$Fxb = -Fdrive \cdot \sin\theta \tag{10-1}$$

$$Fzb = Fdrive \cdot \cos\theta \tag{10-2}$$

In this instance, since as discussed previously, the following equation holds, $$Fdrive = Tdrive/RB \tag{4-3}$$

where $\Delta Fxb$ and $\Delta Fzb$ represent amount of displacement of the bearing loads under a condition in which the drive torque is loaded, those values can be expressed as follows:

$$\Delta Fxb = -Fdrive \cdot \sin\theta \tag{11-1}$$

$$\Delta Fzb = Fdrive \cdot \cos\theta \tag{11-2}$$

Accordingly, the parameters $\theta$ and $\alpha$, which form the brake conversion coefficient, can be determined using the following equations:

$$\tan\theta = -\Delta Fxb/\Delta Fzb \tag{12-1}$$

$$RB = Tdrive/Fdrive \tag{12-2}$$

Where the target wheel, for which the load is to be measured, is the driven wheel, the driving force Fdrive brought about by the driving toques is zero, that is, Fdrive=0. Accordingly, the driving toques may be applied from the side of the driving wheel under a condition in which on one side or opposite sides of the driven wheel to perform similar processing on the basis of the inputted load Fx acting in the forward and rearward direction.

In the revision mode execution unit 36, the following operation is also executed.

(1) The presence or absence of an abnormality in the sensor operation is checked.

By checking whether or not the output value of the load sensor under a condition in which the drive torque Tdrive is applied attains a value appropriate to the applied torque, the presence or absence of the abnormality in the sensor is determined. A check unit used in this case may be operable to compare the value of the sensor output with a predetermined reference value or compare the bearing load FB, which is calculated by the load calculating unit 32 in the sensor ECU 30A, with the predetermined reference value.

(2) In the case of the construction in which no torque sensor 96 (shown in FIG. 14) for detecting the drive torque is employed, if the detected load value is low for the expected output torque, it is determined that an abnormality occurs in the output torque. In the abnormality annunciation unit 36a in the revision mode execution unit 36, where no torque sensor 96 is employed, by comparing the drive torque expected value from the host ECU 98 with the detected bearing load, a check is carried out to determine if a normal torque is outputted and, depending on the necessity, a result is presented. As the output torque expected value from the host ECU 98, where an electric motor is used as the drive engine 99, a drive torque command value or a value estimated from the value of an electric driving current can be used. In the case where the drive engine 99 is an internal combustion engine, a value estimated from the accelerator opening and the number of rotations can be used. The range of tolerance in the subsequent checking may be properly set depending on the reliability of that expected value. The check unit in this case may be any type capable of estimating the drive torque Tdrive with the use of the brake conversion coefficient and the bearing load displacement amount $\Delta Fb$ then calculated and subsequently comparing it with the drive torque information Tdrive inputted from the host ECU 98. Where no load within the range set up as the expected bearing load is detected as a result of the checking, the abnormality annunciation unit 36a determines the presence of some abnormality and outputs a warning information.

(3) The brake conversion coefficients RB and $\theta$ are updated and revised.

Checking is made to determine if the brake conversion coefficients RB and $\theta$ have changed as a result of frictional wear and/or aged deterioration of the brake and, if required as a result of the checking, those coefficients are updated. In updating of the brake conversion coefficients, the reliability of the correction will increase if arrangement is so made as to compare the coefficients RB and $\theta$, calculated at the time of execution of the revision mode, and the known coefficient values stored in the sensor ECU 30A and to select the updating of the brake conversion coefficient while the result of calculation is also presented when amount of the change is beyond the reference range.

Effects obtained from the above described second embodiment of the present invention, which are summarized, are presented as follows:

Owning to the revision mode execution unit 36, the value of the load calculation parameters for the brake ON state can be detected with a simplified operation.

The checking of the load sensor operation and the output torque, which has hitherto been difficult to accomplish without any measuring device, can be performed with a simplified method with no automobile vehicle being moved.

The load estimation appropriate to the current brake state can be performed by feeding the result of detection by the revision mode execution unit 36 back to the load calculator 32 and, therefore, the load estimating accuracy can be increased.

Even with the driven when, the influence brought about by the brake can be detected by adding the load Fx, acting in the forward and rearward direction, from the drive wheel while the driven wheel is then held in a braked condition.

In the sensor equipped wheel support bearing apparatus according to this second embodiment, in the signal processor 31 of the sensor ECU 30A, the average value and/or the amplitude value of the respective signals of those two strain detection elements 22A and 22B in those sensor units 20 are extracted as the output signal of each sensor unit 20. The average value in this case is a value obtained by summing the signals of the two strain detection elements 22A and 22B (best shown in FIG. 2). The amplitude value in this case is a value calculated with the use of the difference value of the output signals of the two strain detection elements 22A and 22B. In this case, the signal processor 31 may calculate the average value and the amplitude value, or the average value alone, with the use of the output signal within a certain time span, as the output signal of each sensor unit 20.

The strain generation member 21 of the sensor unit 20 may be provided with, for example, a temperature sensor 40 as shown by the phantom line in FIG. 15, so that the signal processor 31 may correct the output signal of each sensor unit 20 in dependence on the temperature detected by the temperature sensor 40. If so constructed as described above, a temperature drift in the output signal of the sensor unit 20 can be compensated for.

According to the sensor equipped wheel support bearing apparatus designed in accordance with the second embodiment described above, revision of the output of the load sensor may be performed simply during the checkout of the vehicle since one or more (four, in this instance) sensor unit 20 is provided as a sensor for detecting the load imposed on the wheel support bearing apparatus 100, the output signal of each sensor unit 20 is processed by the signal processor 31 to generate the signal vector S, the load applied to the vehicle wheel is calculated in the load calculator 32 with the use of the signal vector S so obtained, and the result of calculation by the load calculator 32 is checked by the revision mode execution unit 36.

Figure 16:
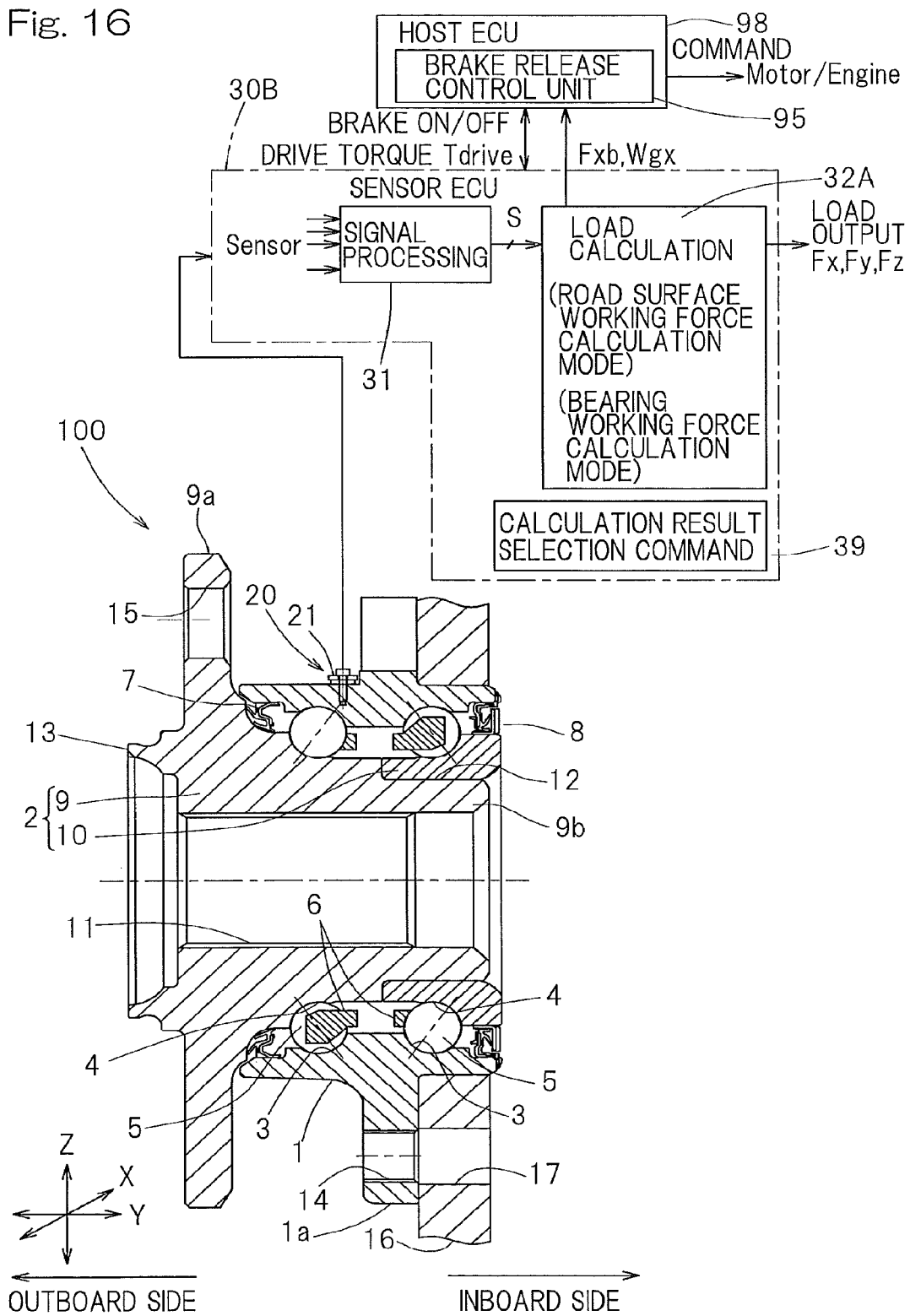
FIG. 16 is a diagram showing a longitudinal sectional view of the sensor equipped wheel support bearing apparatus, designed according to a third embodiment of the present invention, and a block diagram showing the conceptual construction of the detection system therefor.
Figure 17:
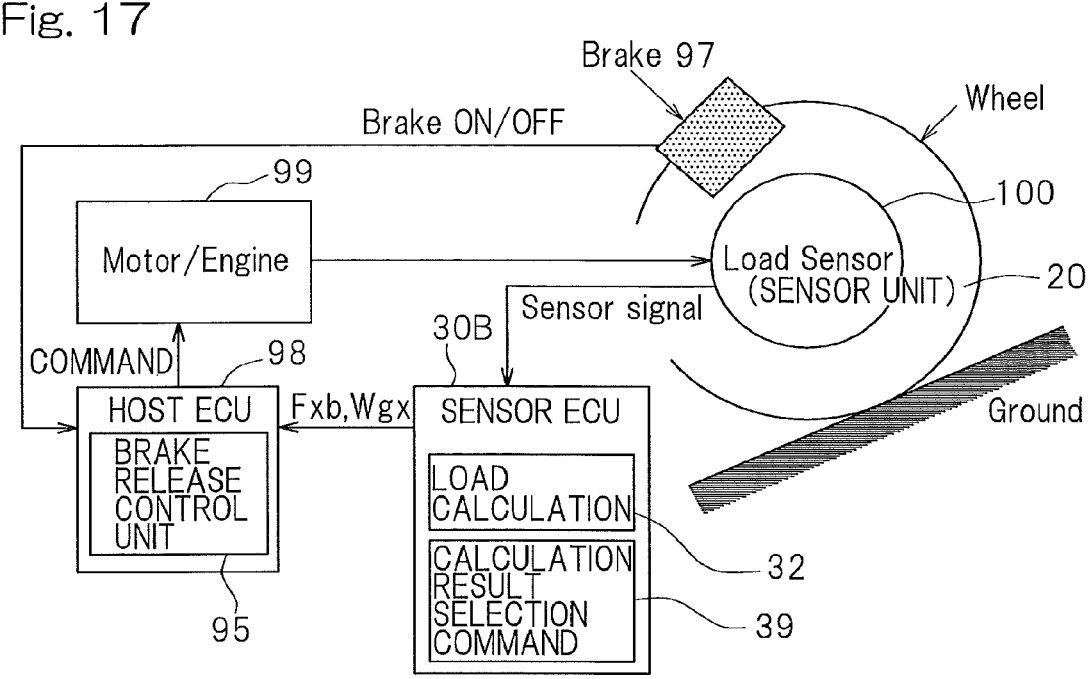
FIG. 17 is a block diagram showing a conceptual construction of the vehicle control system including the detecting system.

The third embodiment of the present invention will now be described with particular reference to FIGS. 16 to 19. This third embodiment is similar to the previously described first embodiment, but differs therefrom in that in place of the load calculation unit 30 shown in FIG. 1 and employed in the practice of the previously described first embodiment, a sensor ECU 30B including a load calculator 32A having a road surface working force calculation mode and a bearing working force calculation mode is employed as best shown in FIG. 16. It is to be noted that FIG. 2, FIGS. 4 to 7, reference to which has been made in describing the first and second embodiments, are applicable to the description of the third embodiment and as they stand, therefore, the details made with reference those figures will not be reiterated in the description that follows.

The strain detection element 22 of each sensor unit 20 is connected with the sensor ECU 30B shown in FIG. 16. The sensor ECU 30B includes a signal processor 31 for processing an output signal of each sensor unit 20 to generate a signal vector, a load calculator 32A for calculating the load, acting on the vehicle wheel, from the signal vector so generated, and a calculation result selection command unit 39. The arithmetic expressions for the brake ON state and the arithmetic expressions for the brake OFF state, both of which have previously been described in connection with the first embodiment, are applicable to this third embodiment with no modification made thereto.

The load calculator 32A has a road surface working force calculation mode, in which during the brake ON state an influence of a working force from the brake disc is corrected to calculate and then output a load Wgx acting on the road surface, and a bearing working force calculation mode in which without making a correction thereto a load Fxb acting on the wheel support bearing apparatus 100 is directly calculated and outputted. The host ECU 98 is a vehicle control device capable of performing an integrated control of the automobile vehicle and includes a brake release control unit 95 for performing, as a part of its control, a brake release control at the time of hill start of the vehicle. In other words, the brake release control unit 95 has a function of acquiring the road surface load Wgx, which is calculated and outputted by the load calculator 32A under the road surface working force calculation mode during a condition with no driving force being applied, when the vehicle is stopped with the brake ON state, and subsequently controlling the driving force while monitoring the bearing load Fxb, which is calculated and outputted by the load calculator 32A under the bearing working force calculation mode during the brake ON state, to thereby release the brake under a predetermined proper condition. This brake release control is carried out when the vehicle driver then pressing a brake pedal begins pressing an accelerator pedal to start the vehicle.

When the vehicle stops on a slope road, the load calculator 32A of the sensor ECU 30B outputs a load information on at least one of the above discussed two modes to the host ECU 98. The switching of the modes may be carried out by commanding the calculation result selection command unit 39, provided in the sensor ECU 30B, to select which one of respective results of calculation under the associated modes is to be outputted, or by allowing a selection command to be issued from the host ECU 98 to the load calculator 32A. Also, arrangement may be made to allow the load calculator 32A to output the result of calculation under both of the modes.

Here, a road surface load calculation when the vehicle is held stopped with the brake ON state will now be discussed. The load calculation method during the brake ON state can be calculated on the basis of the calculation processing method determined during the brake OFF state. As shown in FIG. 7, reference to which has already been made hereinbefore, it is assumed that the brake pad 97 is positioned at a distance of the radius RB with an angle θ upwardly with respect to the direction of travel and the braking force FB is acting from the brake pad 97 so positioned. It is also assumed that the radius of the vehicle wheel is RW and from the driving force the input torque Tdrive is acting. At this time, the load during the brake condition in which the vehicle is stopped with Tdrive=0 can be calculated by the following arithmetic expressions.

From the previously discussed equations (1-1), (1-2) and (3), the loads Fxb and Fzb, which act on the bearing assembly during the brake ON state, can be expressed by the following equations (13-1) and (13-2):

$$Fxb=(1+\alpha\cdot\sin\theta)\cdot Fx-(Tdrive/Rb)\cdot\sin\theta \quad (13\text{-}1)$$

$$Fzb=Fz+(Tdrive/RB-\alpha\cdot Fx)\cdot\cos\theta \quad (13\text{-}2)$$

where $\alpha=RW/RB$: Radial ratio

When the parameter Tdrive is zero (0), the following equations hold:

$$Fxb=(1+\alpha\cdot\sin\theta)\cdot Fx \quad (14\text{-}1)$$

$$Fzb=Fz-\alpha\cdot Fx\cdot\cos\theta \quad (14\text{-}2)$$

and, therefore, the road surface load can be determined from the following equations (15-1) and (15-2):

$$Fx=A\cdot Fxb \quad (15\text{-}1)$$

$$Fz=Fzb+A\cdot Fxb\cdot\alpha\cdot\cos\theta \quad (15\text{-}2)$$

where $A=1/(1+\alpha\cdot\sin\theta)$

By means of the calculation carried out in the manner described above, during the brake ON state, a value to be detected is sum of the road surface load desired to be detected and a load component proportional to the baking force FB added thereto. Accordingly, if the brake caliper position (the radius RB and the angle θ from the x-axis) relative to the driving axle is known, it is possible to accurately detect the road surface load during the braking.

Figure 18:
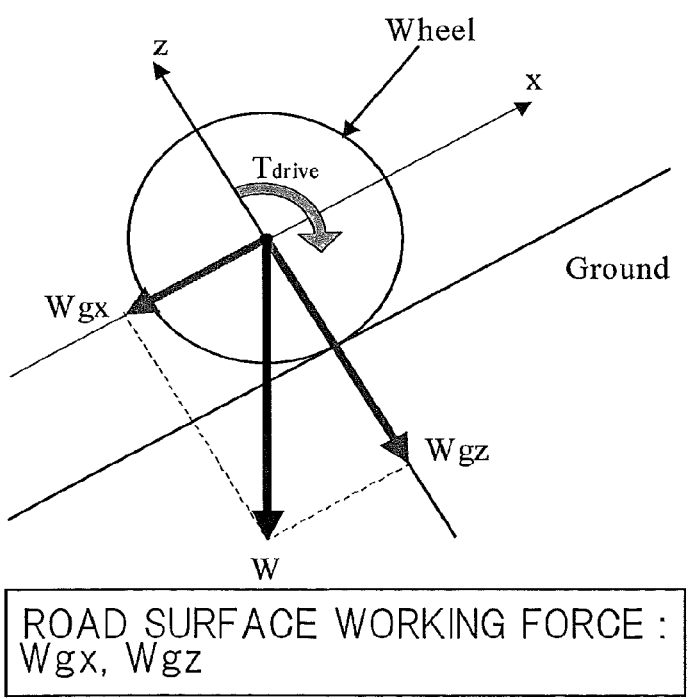
FIG. 18 is an explanatory diagram used to explain a road surface acting force of a vehicle wheel of an vehicle at a slope road.

Now the road surface load calculation process in the load calculator 32 when the vehicle is held in the brake ON state and parked at the slope road will now be discussed. As shown in FIG. 18, it is assumed that a load W is acting on the vehicle wheel in a vertically downward direction. Now, by the effect of the load Wgx acting on the road surface, the vehicle when the brake is released advances in a direction counter to the direction of travel. Accordingly, a calculation method to determine the drive torque Tdrive with which the vehicle can stop at the slope road is shown as follows.

When the vehicle is held stopped on the inclined surface as shown in FIG. 18, a torque that satisfies the following equation (16) need be prepared in order to prevent the vehicle from moving even though the brake is OFF while the road surface load Wgx acts in the x direction:

$$Tdrive/RW=Wgx \quad (16)$$

From the equation (16) above, the equation (16) is rendered to be:

$$Tdrive/RB = RW/RB \cdot Wgx = \alpha \cdot Wgx \qquad (17)$$

By so doing, the vehicle does not move even at the time of the brake release.

If the torque that satisfies the equation (17) above is applied, the bearing loads will become as the following equations from the equations (1-1) and (1-2):

$$Fxb = Wgx + (\alpha \cdot Wgx - Tdrive/RB) \cdot \sin\theta = Wgx \qquad (18-1)$$

$$Fzb = Wgz + (Tdrive/RB - \alpha \cdot Wgx) \cdot \cos\theta = Wgz \qquad (18-2)$$

Thus, it will readily be seen that if the force on the brake caliper balances, the vehicle does not move on the inclined surface even though the brake is held in the OFF state.

Specific procedures of the brake release control performed by the brake release control unit 95 of the host ECU 98 when the vehicle is stopped on the slope road under the brake ON state will now be described.

(1) A condition (a flat road surface or a slope road surface) of the road surface on which the vehicle wheels are held standstill is determined.

When the vehicle wheel is stopped on the flat road surface with the brake in the ON state, the road surface load Fx and the bearing load Fxb become equally zero (0). On the other hand, when the vehicle wheel is stopped on the slope road with the brake in the ON state, the two outputs take different values. Accordingly, in the event that the value of the road surface load Fx detected while the brake is in the ON state does not fall within a predetermined region in the vicinity of zero (0), it can be determined that the vehicle wheel is on the inclined road surface. At this time, in the host ECU 98 for controlling the vehicle, the road surface load value Wgx determined from the detection signal of the sensor unit 20, which is a load detecting sensor, is obtained. This value represents a value of the road surface load converted from the bearing load.

Figure 19:
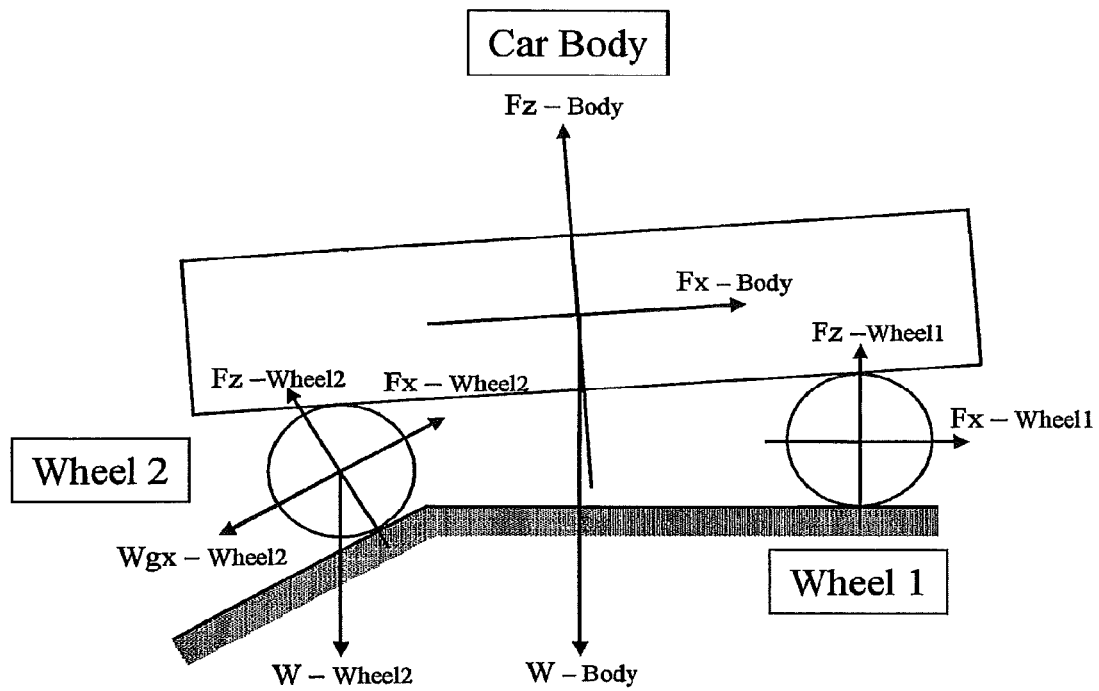
FIG. 19 is an explanatory diagram showing a condition in which a road surface load on each of vehicle wheels of the vehicle are different from each other.

In this instance, with a vehicle control system comprised of the sensor equipped wheel support bearing apparatus and a vehicle control device (the host ECU 98) utilizing a sensor output thereof, since even through ground contact loads of the vehicle wheels with the road surface differ from each other, the condition of the load acting on the vehicle wheel can be determined properly, no inclinometer is needed. Also, when as is the case with the technique disclosed in the patent document 11 referred to previously, the condition of the road surface on which the vehicle is stopped is obtained from the inclinometer, and when the relationship between the vehicle and the road surface is such as shown in FIG. 19, no accurate vehicle condition is estimated and there is the risk that a backward drag may occur, but with this vehicle control system it can be avoided.

(2) When it is determined that the vehicle wheel is stopped on the inclined road surface with the brake in the ON state is determined, the driving force is controlled while the bearing load Fxb is monitored and, subsequently, the brake is released under a proper condition. In the brake release control unit 95 in the host ECU 98, while the bearing load Fxb obtained from the sensor ECU 30B is monitored, the drive torque Tdrive is applied by the time the value of the bearing load Fxb becomes equal to the road surface load Wgx. Since at this time the torque acting from the brake pad to the disc becomes zero (0), the vehicle wheel is in condition unable to move even though the brake is released. If the brake is released under this condition and a proper torque Tdrive is further applied, it is possible to start a smooth movement without being accompanied by any backward drag. This will now be discussed using equations as follows.

When the brake is in the ON state, the bearing load Fxb under the condition of Tdrive=0 is detected and the road surface load Wgx is determined as expressed by the following formula (19):

$$Fx = Wgx = A \cdot Fxb \qquad (19)$$

When, while the bearing load Fxb is monitored the drive torque Tdrive is applied, the following equation (20) comes to establish, the force on the brake disc is in balance and, therefore, the vehicle is held in condition unable to move even thought the brake is in the OFF state:

$$Fxb = Wgx \qquad (20)$$

It is to be noted that not only can the brake release at the time of the hill start be accomplished under an automatic control executed by the host electric unit 98 as hereinabove described, but the vehicle driver can perform a similar brake release manually with the use of the road surface working force Wxg, which is the result of calculation performed by the load calculator 32A, and the load value Fxb at the wheel support bearing assembly.

Effects delivered by the above described third embodiment of the present invention will now be summarized as set forth below.

When the vehicle is stopped on the slope road, the vehicle does not move in a direction counter to the direction of travel even though the brake is set to the OFF state.

Since the vehicle does not move on the slope road in the direction counter to the direction of travel, a stabilized and smooth run is possible.

Since the load actually acting on the vehicle and, based on the detected value, the drive torque is controlled, the accurate torque input is possible as compared with the case in which the required torque is determined according to estimation. Accordingly, an undesirable backward drag can be effectively avoided. Also, since during the brake operation the driving force is set to OFF and the optimum torque can be applied immediately before the brake release, there is no possibility that a superfluous drive torque is applied to use energies unnecessarily and heating and wear of driving component parts can be minimized.

Only with the bearing load Fxb inputted from the load calculator 32A of the sensor ECU 30B the vehicle control can be accomplished. Accordingly, no torque sensor for detecting an output torque of the engine is needed.

Since using the respective values of the road surface load Wgx and the bearing load Fxb calculated by the load calculator 32A of the sensor ECU 30B, the brake release control unit 95 of the host ECU 98, which is the vehicle control device, determines the flat road surface or the slope road surface for each of the vehicle wheels, no inclinometer is needed in the vehicle.

Also, since even when portion of the vehicle wheels is held standstill on the inclined road surface, the brake can be optimally released for each of the vehicle wheels, any undesirable movement of the vehicle can be avoided.

Also, the revision mode execution unit 36 employed in the practice of the foregoing second embodiment of the present invention may be incorporated in the sensor equipped wheel support bearing apparatus according to the third embodiment of the present invention.

It is to be noted that although in describing each of the foregoing embodiments, the outer member 1 has been shown and described as serving the stationary member, the present invention is equally applicable to the wheel support bearing apparatus in which the inner member serves as the stationary member and, in such case, the sensor unit 20 is to be provided in a peripheral surface which forms an inner periphery of the inner member.

Although in describing each of the embodiments the examples are shown and described as applied to the three generation type wheel support bearing apparatus 100, the present invention can be equally applied to the first or second generation type wheel support bearing apparatus, in which a bearing portion and a hub are members independent and separate from each other, as well as the fourth generation type wheel support bearing apparatus of a type in which a part of the inner member is constituted by an outer ring of a constant velocity universal joint. Yet, the sensor equipped wheel support bearing apparatus of the present invention can be applied to a wheel support bearing apparatus for the support of the driven wheel and also to a tapered roller type wheel support bearing apparatus of any generation type.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Outer member
2 . . . Inner member
3, 4 . . . Rolling surface
5 . . . Rolling element
20 . . . Sensor unit
21 . . . Strain generation member
21a . . . Contact fixing segment
22, 22A, 22B . . . Strain detection element
30 . . . Load calculation unit
30A, 30B . . . Sensor ECU
31 . . . Signal processor
32, 32A . . . Load calculator
33 . . . Comparator
34 . . . ECU
35 . . . Load value correction unit
36 . . . Revision mode execution unit
36a . . . Abnormality annunciation unit
37 . . . ON/OFF information input unit
38 . . . Drive torque information input unit
39 . . . Calculation result selection command unit
96 . . . Torque sensor
98 . . . Host ECU (Vehicle control device)
100 . . . Wheel support bearing apparatus

What is claimed is:

1. A sensor equipped wheel support bearing apparatus comprising:
a bearing assembly including an outer member having an inner periphery formed with a plurality of rolling surfaces, an inner member having an outer periphery formed with rolling surfaces held in face to face relation with the rolling surfaces of the outer member, a plurality of rows of rolling elements interposed between the respective rolling surfaces in the outer member and the inner member;
at least one or more sensor to detect a load acting on the bearing assembly,
a signal processor to process an output signal from each sensor to generate a signal vector, and
a load calculator to calculate a load acting on the vehicle wheel from the signal vector;
wherein the load calculator has a function to determine the presence or absence of a predetermined state in a vehicle that affects a result of calculation of the load, and to perform two types of calculations that correspond respectively to the presence and absence of the state,
wherein the presence or absence of the predetermined state in the vehicle determined by the load calculator is ON or OFF of a brake, and
wherein the load calculator calculates at least a load Fx which acts in a forward and rearward direction of the wheel support bearing assembly and determines the ON or OFF of the brake by utilizing the calculation results in the form of the load Fx that acts in the forward and rearward direction.

2. The sensor equipped wheel support bearing apparatus as claimed in claim 1, wherein the load of the vehicle wheel calculated by the load calculator, is a load acting on a drive wheel, and wherein the load calculator determines the brake ON state, information on a driving force applied by the vehicle is supplied from the vehicle to the load calculator, and the load calculator corrects a result of calculation based on the information.

3. The sensor equipped wheel support bearing apparatus as claimed in claim 1, wherein the sensor to detect the load applied to the bearing assembly is capable of detecting a relative displacement between the outer member and the inner member.

4. The sensor equipped wheel support bearing apparatus as claimed in claim 1, wherein the sensor to detect the load applied to the bearing assembly is capable of detecting a strain occurring in one of the outer member and the inner member that serves as a stationary member.

5. The sensor equipped wheel support bearing apparatus as claimed in claim 4, wherein the sensor is in the form of a sensor unit provided on an outer diametric surface of one of the outer member and the inner member that serves as a stationary member, and the sensor unit includes a strain generation member, fixed to the outer diametric surface of the stationary member in contact therewith, and one or more strain detection elements fitted to the strain generation member to detect the strain occurring in the strain generation member, and wherein four sensor units are provided on an upper surface area, a lower surface area, a right surface area and a left surface area of the outer diametric surface of the stationary member, which correspond respectively to top, bottom, left and right positions relative to a tire tread, and are equidistantly spaced in a phase difference of 90° in a circumferential direction thereof.

6. The sensor equipped wheel support bearing apparatus as claimed in claim 5, wherein the sensor unit includes a strain generation member, having three or more contact fixing segments that are fixed to the outer diametric surface of the stationary member in contact therewith, and two or more strain detection elements fixed to the strain generation member to detect a strain occurring in the strain generation member.

7. The sensor equipped wheel support bearing apparatus as claimed in claim 6, wherein the strain generating elements are provided intermediate between the neighboring first and second contact fixing segments and intermediate between the neighboring second and third contact fixing segments, respectively, and a distance between the neighboring contact fixing segments or a distance between the neighboring strain detection elements is set to a value which is {n+½} times an arrangement pitch of the rolling elements, where n represents an integer.

8. The sensor equipped wheel support bearing apparatus as claimed in claim 1, further comprising a revision mode execution unit to check the result of calculation outputted by the load calculator.

9. The sensor equipped wheel support bearing apparatus as claimed in claim 8, wherein the load calculator has a function of calculating an influence, exerted by the brake upon the bearing assembly, as a brake conversion coefficient, and of determining a calculation coefficient matrix for the brake ON state from a calculation coefficient matrix for the brake OFF state to calculate the load for the brake ON state.

10. The sensor equipped wheel support bearing apparatus as claimed in claim 9, wherein parameters of the brake conversion coefficients includes a ratio ($\alpha$) of a tire radius/a brake caliper mounting position radius and an angle ($\theta$) from a brake caliper x axis to the brake caliper mounting position.

11. The sensor equipped wheel support bearing apparatus as claimed in claim 8, wherein the revision mode execution unit executes a revision with the use of a load value detected, when the drive torque is applied while the vehicle is in a stopped state and the brake is in the ON state.

12. The sensor equipped wheel support bearing as claimed in claim 1, wherein the load calculator is capable of executing a road surface working force calculation mode in which a load acting on the road surface is calculated and outputted, and a bearing working force calculation mode in which a load acting on the wheel support bearing assembly is calculated and outputted.

13. The sensor equipped wheel support bearing apparatus as claimed in claim 12, wherein a function of commanding the load calculator to select one result to be outputted from the results of calculation from the road surface working force calculation mode and the bearing working force calculation mode is provided in a host ECU in the vehicle, which is outside of the sensor equipped wheel support bearing apparatus.

14. A vehicle control device to control a vehicle with the use of an sensor output from the sensor equipped wheel support bearing apparatus as defined in claim 12, comprising a brake release control unit operable to obtain a road surface load (Wgx), which is calculated and outputted by the load calculator in the sensor equipped wheel support bearing apparatus under the road surface working force calculation mode during a condition, in which no driving force is applied while the vehicle is held stopped under the brake OFF state, and subsequently to control the driving force while monitoring a bearing load (Fxb), which is calculated and outputted by the load calculator under the bearing working force calculation mode under the brake ON state, to thereby release the brake under proper conditions.

15. The vehicle control device as claimed in claim 14, wherein the break release control unit has a function of evaluating the values of the road surface load (Wgx) and the bearing load (Fxb) obtained from the sensor equipped wheel support bearing apparatus when the vehicle is stopped under the brake ON state to determine a condition in which the vehicle wheel is standstill on an inclined surface, in the event that a difference between those loads is larger than a predetermined threshold value.

16. The vehicle control device as claimed in claim 14, wherein the brake release unit defines the proper condition for release of the brake as a condition in which the value of the bearing load (Fxb) obtained from the sensor equipped wheel support bearing apparatus when vehicle is stopped with the brake held in the ON state, becomes substantially equal to the road surface load (Wgx) obtained from the sensor equipped wheel support bearing apparatus under a condition in which no driving force is applied.

17. The vehicle control device as claimed in claim 14, wherein the brake release control unit executes its control during a period when a vehicle driver releases the brake to shift to a travelling condition to the time of actual release of the brake.

\* \* \* \* \*